United States Patent
Fitzgerald et al.

(10) Patent No.: US 12,096,031 B2
(45) Date of Patent: Sep. 17, 2024

(54) METHOD AND APPARATUS FOR DIGITAL CONTENT STREAM COMPRESSION AND DECOMPRESSION

(71) Applicant: Immersive Robotics Pty Ltd, Queensland (AU)

(72) Inventors: Daniel Liam Fitzgerald, Queensland (AU); Rodney Ian Lamb, Queensland (AU); Timothy Simon Lucas, Queensland (AU)

(73) Assignee: Immersive Robotics PTY Ltd., Queensland (AU)

( * ) Notice: Subject to any disclaimer, the term of this patent is extended or adjusted under 35 U.S.C. 154(b) by 0 days.

(21) Appl. No.: 16/619,054

(22) PCT Filed: May 31, 2018

(86) PCT No.: PCT/AU2018/050534
§ 371 (c)(1),
(2) Date: Dec. 3, 2019

(87) PCT Pub. No.: WO2018/223179
PCT Pub. Date: Dec. 13, 2018

(65) Prior Publication Data
US 2020/0145696 A1 May 7, 2020

Related U.S. Application Data

(60) Provisional application No. 62/515,002, filed on Jun. 5, 2017.

(51) Int. Cl.
*H04N 19/12* (2014.01)
*H04N 19/18* (2014.01)
(Continued)

(52) U.S. Cl.
CPC .......... *H04N 19/625* (2014.11); *H04N 19/12* (2014.11); *H04N 19/18* (2014.11); *H04N 19/182* (2014.11)

(58) Field of Classification Search
None
See application file for complete search history.

(56) References Cited

U.S. PATENT DOCUMENTS

| 4,504,263 A | 3/1985 | Steuer |
| 5,325,125 A | 6/1994 | Naimpally et al. |

(Continued)

FOREIGN PATENT DOCUMENTS

| CA | 2798300 | 6/2014 |
| CN | 1675929 | 9/2005 |

(Continued)

OTHER PUBLICATIONS

Taylor, Clark N.; et al. "Adaptive Image Compression for Wireless Multimedia Communication," University of California San Diego. 5 Pages.

(Continued)

*Primary Examiner* — Tyler W. Sullivan
(74) *Attorney, Agent, or Firm* — Fish IP Law, LLP; Tomas A. Prieto

(57) ABSTRACT

Systems and methods for compressing image data from images forming part of a digital content stream. The method includes, for a sequence of n images within the digital content stream, obtaining image data for each of the n images and compressing the image data for at least some of the n images using a respective compression scheme.

18 Claims, 13 Drawing Sheets

(51) Int. Cl.
*H04N 19/182* (2014.01)
*H04N 19/625* (2014.01)

(56) References Cited

U.S. PATENT DOCUMENTS

| | | | |
|---|---|---|---|
| 5,559,557 A | 9/1996 | Kato | |
| 5,703,793 A | 12/1997 | Wise et al. | |
| 5,909,250 A | 6/1999 | Hardiman | |
| 5,963,673 A | 10/1999 | Kodama et al. | |
| 6,078,349 A | 6/2000 | Molloy | |
| 6,091,777 A | 7/2000 | Guetz et al. | |
| 6,101,284 A | 8/2000 | Matsubara et al. | |
| 6,233,590 B1 | 5/2001 | Shaw et al. | |
| 6,249,614 B1 | 6/2001 | Kolesnik | |
| 6,252,989 B1 | 6/2001 | Geisler et al. | |
| 6,259,991 B1 | 7/2001 | Nysen | |
| 6,310,962 B1 | 10/2001 | Chung et al. | |
| 6,353,685 B1 | 3/2002 | Wu et al. | |
| 7,027,655 B2 | 4/2006 | Keeney et al. | |
| 7,583,982 B2 | 9/2009 | Olsen et al. | |
| 7,689,047 B2 | 3/2010 | Bahar et al. | |
| 7,692,642 B2 | 4/2010 | Wyatt | |
| 7,734,105 B2 | 6/2010 | Strom et al. | |
| 7,904,117 B2 | 3/2011 | Doan | |
| 8,098,941 B2 | 1/2012 | Moussavi et al. | |
| 8,184,069 B1 | 5/2012 | Rhodes | |
| 8,366,552 B2 | 2/2013 | Perlman et al. | |
| 8,369,324 B1 | 2/2013 | Breight et al. | |
| 8,374,242 B1 | 2/2013 | Lewis et al. | |
| 8,416,847 B2 | 4/2013 | Roman | |
| 8,457,026 B1 | 6/2013 | Ho | |
| 8,787,454 B1 | 7/2014 | Chechik et al. | |
| 8,965,140 B1* | 2/2015 | Xu | H04N 19/14 382/273 |
| 9,281,559 B2 | 3/2016 | Ransom et al. | |
| 9,367,499 B2 | 6/2016 | Yun et al. | |
| 9,596,053 B1 | 3/2017 | Marupaduga et al. | |
| 9,648,346 B2 | 5/2017 | Zhang | |
| 9,665,332 B2 | 5/2017 | Otsuka | |
| 9,811,874 B2 | 11/2017 | Narayanan et al. | |
| 10,155,160 B2 | 12/2018 | Van Der Laan et al. | |
| 10,224,758 B2 | 3/2019 | Leabman | |
| 10,237,577 B2 | 3/2019 | Jeong et al. | |
| 10,243,414 B1 | 3/2019 | Leabman | |
| 10,523,914 B1* | 12/2019 | Phillips | H04N 21/21805 |
| 10,657,674 B2* | 5/2020 | Fitzgerald | H04N 19/124 |
| 2001/0007575 A1 | 7/2001 | Mori | |
| 2002/0090140 A1 | 7/2002 | Thirsk | |
| 2002/0154693 A1 | 10/2002 | Demos et al. | |
| 2003/0138150 A1 | 7/2003 | Srinivasan | |
| 2005/0018911 A1 | 1/2005 | Deever | |
| 2005/0152450 A1 | 7/2005 | Ueno | |
| 2006/0195464 A1 | 8/2006 | Guo | |
| 2007/0037528 A1 | 2/2007 | Doan | |
| 2007/0263938 A1* | 11/2007 | Lee | H04N 19/17 382/248 |
| 2008/0055318 A1 | 3/2008 | Glen | |
| 2008/0211901 A1 | 9/2008 | Civanlar et al. | |
| 2008/0266410 A1 | 10/2008 | Fukuhara | |
| 2009/0016631 A1 | 1/2009 | Naito | |
| 2009/0033588 A1 | 2/2009 | Kajita | |
| 2010/0093282 A1 | 4/2010 | Martikkala et al. | |
| 2010/0124279 A1 | 5/2010 | Reddy et al. | |
| 2011/0038556 A1 | 2/2011 | Mathe | |
| 2011/0235706 A1 | 9/2011 | Demircin | |
| 2012/0121012 A1 | 5/2012 | Shiodera | |
| 2012/0206452 A1 | 8/2012 | Geisner et al. | |
| 2012/0275718 A1 | 11/2012 | Takamori | |
| 2012/0314026 A1 | 12/2012 | Chen et al. | |
| 2013/0040682 A1 | 2/2013 | Chang | |
| 2013/0215961 A1 | 8/2013 | Nakagawa et al. | |
| 2014/0022125 A1 | 1/2014 | Zhu | |
| 2014/0118398 A1 | 5/2014 | Hall | |
| 2014/0128032 A1 | 5/2014 | Muthukumar | |
| 2014/0184475 A1* | 7/2014 | Tantos | H04N 21/234318 345/8 |
| 2014/0218236 A1 | 8/2014 | Sadeghi et al. | |
| 2014/0241428 A1 | 8/2014 | Sato | |
| 2014/0348438 A1 | 11/2014 | Yang | |
| 2014/0357993 A1 | 12/2014 | Hiriyannaiah et al. | |
| 2015/0031296 A1 | 1/2015 | Holman et al. | |
| 2015/0071359 A1 | 3/2015 | Guo | |
| 2015/0103183 A1 | 4/2015 | Abbott | |
| 2015/0172545 A1 | 6/2015 | Szabo | |
| 2015/0237351 A1 | 8/2015 | Lee et al. | |
| 2015/0279103 A1 | 10/2015 | Naegle et al. | |
| 2016/0119646 A1 | 4/2016 | Eslami | |
| 2016/0127490 A1 | 5/2016 | Li | |
| 2016/0248995 A1 | 8/2016 | Mullins | |
| 2016/0259032 A1 | 9/2016 | Hehn et al. | |
| 2016/0267884 A1 | 9/2016 | Binstock et al. | |
| 2016/0357367 A1 | 12/2016 | Foster | |
| 2016/0360209 A1 | 12/2016 | Gosling | |
| 2016/0380692 A1 | 12/2016 | Jalali | |
| 2016/0381398 A1 | 12/2016 | Saxena | |
| 2017/0006290 A1 | 1/2017 | Osawa | |
| 2017/0051171 A1 | 2/2017 | Adamic et al. | |
| 2017/0053450 A1* | 2/2017 | Rodriguez | G06T 7/579 |
| 2017/0060678 A1 | 3/2017 | Jeganathan et al. | |
| 2017/0069227 A1 | 3/2017 | Dialameh et al. | |
| 2017/0072483 A1 | 3/2017 | Gamble | |
| 2017/0072484 A1 | 3/2017 | Baratta | |
| 2017/0075416 A1* | 3/2017 | Armstrong | G06F 3/1454 |
| 2017/0085462 A1 | 3/2017 | Zhou et al. | |
| 2017/0085872 A1* | 3/2017 | Perron | H04N 19/117 |
| 2017/0098231 A1 | 4/2017 | Dietrich | |
| 2017/0103571 A1 | 4/2017 | Beaurepaire | |
| 2017/0194706 A1 | 4/2017 | Lee et al. | |
| 2017/0142444 A1 | 5/2017 | Henry | |
| 2017/0150147 A1 | 5/2017 | Forsyth et al. | |
| 2017/0191429 A1 | 7/2017 | Tylutki et al. | |
| 2017/0207971 A1 | 7/2017 | Kripalani et al. | |
| 2017/0221182 A1 | 8/2017 | Cawley et al. | |
| 2017/0236252 A1 | 8/2017 | Nguyen | |
| 2017/0280145 A1* | 9/2017 | Kubota | H04N 19/176 |
| 2017/0285735 A1 | 10/2017 | Young et al. | |
| 2017/0286735 A1 | 10/2017 | Lazzouni et al. | |
| 2017/0324951 A1* | 11/2017 | Raveendran | G02B 27/0093 |
| 2017/0352322 A1 | 12/2017 | Spence et al. | |
| 2018/0046892 A1 | 2/2018 | Hyde et al. | |
| 2018/0054241 A1 | 2/2018 | Pi | |
| 2018/0055332 A1 | 3/2018 | Lee et al. | |
| 2018/0082904 A1 | 3/2018 | Basker et al. | |
| 2018/0089091 A1* | 3/2018 | Akenine-Moller | G06F 12/0207 |
| 2018/0093177 A1 | 4/2018 | Tokubo | |
| 2018/0095529 A1 | 4/2018 | Tokubo | |
| 2018/0114082 A1 | 4/2018 | Choi | |
| 2018/0132192 A1 | 5/2018 | Yang et al. | |
| 2018/0146198 A1* | 5/2018 | Atluru | H04N 19/167 |
| 2018/0211287 A1 | 7/2018 | Byron et al. | |
| 2018/0224841 A1 | 8/2018 | Tani et al. | |
| 2018/0224842 A1 | 8/2018 | Ichimura | |
| 2018/0229458 A1 | 8/2018 | Thallner et al. | |
| 2018/0229462 A1 | 8/2018 | Shimada et al. | |
| 2018/0268571 A1 | 9/2018 | Park | |
| 2018/0324438 A1* | 11/2018 | Kwak | H04N 19/157 |
| 2018/0357809 A1 | 12/2018 | Lawless et al. | |
| 2019/0019315 A1* | 1/2019 | Bastani | H04N 19/172 |
| 2019/0025760 A1 | 1/2019 | Ashrafi et al. | |
| 2019/0033058 A1 | 1/2019 | Tsurumi | |
| 2019/0089984 A1 | 3/2019 | He | |
| 2019/0110053 A1* | 4/2019 | Varia | H04N 19/46 |
| 2019/0122436 A1 | 4/2019 | Bashkirov | |
| 2019/0141324 A1 | 5/2019 | Bjorklund | |
| 2019/0378305 A1 | 12/2019 | Fitzgerald | |
| 2019/0379428 A1 | 12/2019 | Lucas et al. | |
| 2020/0042263 A1* | 2/2020 | Iyer | G06F 3/1454 |
| 2020/0053393 A1* | 2/2020 | Niamut | H04N 19/597 |

(56) References Cited

U.S. PATENT DOCUMENTS

| | | | | |
|---|---|---|---|---|
| 2020/0081524 | A1* | 3/2020 | Schmidt | G06F 3/013 |
| 2020/0128274 | A1 | 4/2020 | Rosewarne | |

FOREIGN PATENT DOCUMENTS

| | | |
|---|---|---|
| CN | 103096075 | 5/2013 |
| CN | 103188491 | 7/2013 |
| CN | 106688229 | 5/2017 |
| EP | 1720356 | 5/2005 |
| EP | 1892965 | 2/2008 |
| EP | 1892965 A2 | 2/2008 |
| EP | 3013053 A2 | 4/2016 |
| EP | 3313144 | 4/2018 |
| EP | 3336685 | 9/2018 |
| GB | 2450422 | 12/2008 |
| GB | 2478583 | 9/2011 |
| GB | 2480825 | 12/2011 |
| GB | 2484736 | 4/2012 |
| GB | 2485613 | 5/2012 |
| GB | 2485977 | 6/2012 |
| GB | 2486411 | 6/2012 |
| GB | 2486412 | 6/2012 |
| GB | 2486431 | 6/2012 |
| GB | 2486434 | 6/2012 |
| GB | 2486457 | 6/2012 |
| GB | 2488094 | 8/2012 |
| GB | 2538797 | 9/2019 |
| JP | 2011508995 A | 3/2011 |
| JP | 2012521268 A | 9/2012 |
| JP | 2019041394 | 3/2019 |
| KR | 20160109066 A | 9/2016 |
| TW | I334716 B | 12/2010 |
| WO | WO-2004014077 A1 | 2/2004 |
| WO | 2005083558 | 9/2005 |
| WO | 2007020408 | 2/2007 |
| WO | 2009007693 | 1/2009 |
| WO | 2009013499 | 1/2009 |
| WO | WO-2009073824 A1 | 6/2009 |
| WO | WO-2010111100 A1 | 9/2010 |
| WO | 2010114512 | 10/2010 |
| WO | 2010136781 | 12/2010 |
| WO | 2010138124 | 12/2010 |
| WO | 2010144096 | 12/2010 |
| WO | 2011022014 | 2/2011 |
| WO | 2012022838 | 2/2012 |
| WO | 2012056198 | 5/2012 |
| WO | 2012066292 | 5/2012 |
| WO | 2012177378 | 12/2012 |
| WO | WO2012177378 A2 | 12/2012 |
| WO | 2014096791 | 6/2014 |
| WO | 2014177869 | 11/2014 |
| WO | 2014195673 | 12/2014 |
| WO | 2014207439 | 12/2014 |
| WO | 2015079215 | 6/2015 |
| WO | 2015092356 | 6/2015 |
| WO | 2015150727 | 10/2015 |
| WO | 2015180663 | 12/2015 |
| WO | WO-2015180663 A1 | 12/2015 |
| WO | 2016016607 | 2/2016 |
| WO | 2016110679 | 4/2016 |
| WO | 2016071670 | 5/2016 |
| WO | 2016097689 | 6/2016 |
| WO | 2016097694 | 6/2016 |
| WO | 201614992 | 9/2016 |
| WO | 2016135441 | 9/2016 |
| WO | 2016142713 | 9/2016 |
| WO | 2016146992 | 9/2016 |
| WO | 2016151291 | 9/2016 |
| WO | 2016156801 | 10/2016 |
| WO | 2016174392 | 11/2016 |
| WO | 2016189294 | 12/2016 |
| WO | 2017021687 | 2/2017 |
| WO | 2017051171 | 3/2017 |
| WO | 2017060678 | 4/2017 |
| WO | 2017072483 | 5/2017 |
| WO | 2017072484 | 5/2017 |
| WO | 2017085462 | 5/2017 |
| WO | 2017098231 | 6/2017 |
| WO | 2017103571 | 6/2017 |
| WO | 2017207971 | 7/2017 |
| WO | 2017191429 | 11/2017 |
| WO | WO-2017214671 A1 | 12/2017 |
| WO | 2018046892 | 3/2018 |
| WO | 2018055332 | 3/2018 |
| WO | 2018082904 | 5/2018 |
| WO | WO-2018145153 A1 | 8/2018 |
| WO | WO-2018145154 A1 | 8/2018 |
| WO | WO-2018200993 A1 | 11/2018 |
| WO | 2018211287 | 12/2018 |
| WO | 2018224841 | 12/2018 |
| WO | 2018224842 | 12/2018 |
| WO | 2018229458 | 12/2018 |
| WO | 2018229462 | 12/2018 |
| WO | WO-2018223179 A1 | 12/2018 |
| WO | 2019025760 | 2/2019 |
| WO | 2019100108 | 5/2019 |
| WO | 2019100109 | 5/2019 |
| WO | WO-2019100108 A1 | 5/2019 |
| WO | WO-2019100109 A1 | 5/2019 |

OTHER PUBLICATIONS

Yao et al., "A Novel Color Image Compression Algorithm Using the Human Visual Contrast Sensitivity Characteristics", Photonic Sensors (2016), published Jul. 15, 2016, https://link.springer.com/article/10.1007/s13320-016-0355-3, 10 pages.
International Search Report for PCT/AU2018/050534, entitled "Digital Content Stream Compression" in the name of Immersive Robotics Pty Ltd mailed on Dec. 13, 2018, 13 pages.
Farid M., et al., "Adaptive Wavelet Eye-Gaze based Video Compression," Proceedings of SPIE, 2003, vol. 4877, 2003, 9 pages.
International Preliminary Report on Patentability for Application No. PCT/AU2017/050594 mailed on Dec. 27, 2018, 14 pages.
International Preliminary Report on Patentability for Application No. PCT/AU2018/050090 mailed on Aug. 22, 2019, 7 pages.
International Preliminary Report on Patentability for Application No. PCT/AU2018/050091 mailed on Aug. 22, 2019, 5 pages.
International Preliminary Report on Patentability for Application No. PCT/AU2018/051237 mailed on Jun. 4, 2020, 8 pages.
International Search Report and Written Opinion for Application No. PCT/AU2018/050090 mailed on Apr. 6, 2018, 11 pages.
International Search Report and Written Opinion for Application No. PCT/AU2018/050091 mailed on Apr. 6, 2018, 10 pages.
International Search Report and Written Opinion for Application No. PCT/AU2018/051239 mailed on Feb. 4, 2019, 15 pages.
International Search Report for Application No. PCT/AU2017/050594 mailed on Aug. 17, 2017, 9 pages.
International Search Report for Application No. PCT/AU2018/051237 mailed on Jan. 30, 2019, 4 pages.
Search Information Statement for Application No. PCT/AU2018/051237 mailed on Jan. 30, 2019, 1 page.
Written Opinion for Application No. PCT/AU2017/050594 mailed on Aug. 17, 2017, 12 pages.
Written Opinion for Application No. PCT/AU2018/050534 mailed on Aug. 17, 2018, 6 pages.
Written Opinion for Application No. PCT/AU2018/051237 mailed on Jan. 30, 2019, 6 pages.
Behnam Bastani, et al., "Strategies for Foveated Compression and Transmission", Symposium for Information Display, Palisades Convention Management, Inc. 2017, 4 pages.
European Search Report for European Patent Application No. 18881879.3-1208, dated Jun. 24, 2021, 10 pages.
Anderson G.B., et al., "Piecewise Fourier Transformation for Picture Bandwidth Compression," IEEE Transactions on Communication Technology, Apr. 1, 1971, vol. 19 (2), pp. 133-140, XP011218516.
Examination Opinions for Taiwan Patent Application No. 106119982 mailed on Feb. 3, 2021, 99 pages.
Extended European Search Report for European Application No. 18880508.9 dated Feb. 25, 2021, 8 pages.

(56) References Cited

OTHER PUBLICATIONS

International Search Report and Written Opinion for Application No. PCT/AU2020/051115 mailed on Nov. 17, 2020, 12 pages.
Examination report dated Mar. 24, 2022, for related Australian application No. 2018217434. 3 pages.
Anderson, et al. "Piecewise Fourier Transformation for Picture Bandwidth Compression," IEEE Transactions on Communication Technology. vol. COM-19, No. 2, Apr. 1971. 8 pages.
Office action dated Nov. 19, 2021, from related Taiwanese application No. 107116357. 6 pages.
Gonzalez, et al. "Digital Image Processing," Pearson Education International. Third Edition. 976 pages.
Examination Report from related European application No. 18880508.9, dated Mar. 3, 2023. 3 pages.
Gonzalez, et al. "Digital Image Processing," Pearson Prentice Hall. 36 pages.
Decision of Rejection from related Taiwanese application No. 107141137. 4 pages.
International Preliminary Report on Patentability for Application No. PCT/AU2018/050091, mailed on Apr. 6, 2018, 5 pages.
Extended European Search Report for European Application No. 18813535.4 dated Oct. 26, 2020, 9 pages.
Examination Report from related Australian application No. 201817434, 3 pages.
International Search Report for Application No. PCT/AU2017/050594 mailed on Dec. 27, 2018, 14 pages.
European Search Report for Application No. PCT/AU2017/050534 mailed on Oct. 26, 2020, 9 pages.
Australian Search Information Statement No. PCT/AU2018/051237 mailed on Jan. 30, 2019, 8 pages.
European Search Report for Application No. PCT/AU2017/050594 mailed on Jan. 28, 2020, 12 pages.
Written Opinion for Application No. PCT/AU2017/050534 mailed on Aug. 17, 2018, 6 pages.
Written Opinion for Application No. PCT/AU2017/051237 mailed on Jan. 30, 2019, 6 pages.
Behnnam Bastani, et al., "Strategies for Foveated Compression and Transmission", Symposium for Information Display, Palisades Convention Management, Inc. 2017, 4 pages.
International Preliminary Report on Patentability for Application No. PCT/AU2018/051239, mailed on Jun. 4, 2020, 13 pages.
International Preliminary Report on Patentability for Application No. PCT/AU2018/050534, mailed on Dec. 19, 2019, 8 pages.
Examination Report for European Application No. 17812313.9, dated Nov. 5, 2020, 6 pages.
Extended European Search Report for European Application No. 17812313.9, dated Jan. 28, 2020, 10 pages.
Extended European Search Report for European Application No. 18750982.3, dated Oct. 21, 2020, 28 pages.
Extended European Search Report for European Application No. 18751812.1, dated Sep. 24, 2020, 19 pages.

* cited by examiner

METHOD AND APPARATUS FOR DIGITAL CONTENT STREAM COMPRESSION AND DECOMPRESSION

BACKGROUND OF THE INVENTION

The present invention relates to a method and apparatus for compressing or decompressing a digital content stream, and in one particular example for compressing or decompressing a digital content stream using different encoding schemes to allow for transmission of the image data with a reduced bandwidth and low latency.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In virtual, augmented and mixed reality systems, it is typical to provide a wearable display device, such as a Head Mounted Display (HMD), which is displays information to a wearer based on the relative spatial position and/or orientation of the display device. Such systems operate by generating images based on information regarding the pose (position and orientation) of the display device, so that as the display device moves, the images are updated to reflect the new pose of the display device.

In order to avoid motion sickness, it is important that the time difference between collection of the pose information and creation of the corresponding image is minimised, particularly in circumstances where the display device is moving rapidly. This, coupled with the need to generate high resolution images so that these appear as lifelike as possible, means that significant processing hardware is required. As a result, high end existing systems typically require a static desktop computer with a high bandwidth and low latency connection to the display device. Consequently, current systems such as the HTC Vive™, Oculus Rift™ and Playstation VR™ require a wired connection between the computer and the HMD, which is inconvenient.

Whilst mobile solutions are available, such as the Gear VR™, which incorporates a mobile phone to perform the processing and display of images within the HMD itself, the processing ability is limited, meaning the content that can be displayed is restricted, particularly in terms of the image resolution and quality.

It is known to compress image data so as to reduce the data volume. This is useful in many applications, such as reduce the storage capacity required to store the image data, or to reduce bandwidth requirements associated with transmission of the image data.

JPEG uses a lossy form of compression based on the discrete cosine transform (DCT). This mathematical operation converts each frame/field of the video source from the spatial (2D) domain into the frequency domain (a.k.a. transform domain). A perceptual model based loosely on the human psychovisual system discards high-frequency information, i.e. sharp transitions in intensity, and color hue. In the transform domain information is reduced through quantization. The quantized coefficients are then sequenced and losslessly packed into an output bitstream.

However, such approaches only achieve a limited amount of compression and require significant processing time, making these unsuitable for use in low latency applications, such as virtual or augmented reality, telepresence or the like.

SUMMARY OF THE PRESENT INVENTION

In one broad form an aspect of the present invention seeks to provide a method of compressing image data from images forming part of a digital content stream, the method including for a sequence of n images within the digital content stream: obtaining image data for each of the n images; and, compressing the image data for at least some of the n images using a respective compression scheme.

In one embodiment the method includes compressing the sequence of n images using a sequence of compression schemes.

In one embodiment the method includes compressing a number of sequences of n images, each sequence being compressed using the same sequence of compression schemes.

In one embodiment at least two of the respective compression schemes provide a different degree of compression.

In one embodiment, at least one of: each of the n images are compressed using a different compression scheme; each of the n images are compressed using a different compression scheme providing a different degree of compression; at least one of the n images is compressed using a different compression scheme to each adjacent image; at least two images in the sequence of n images are compressed using a common compression scheme; at least one of the n images is compressed using a lossless compression scheme; at least one of the n images is compressed using a lossy compression scheme; at least one of the n images is uncompressed; and, at least one of the n images is discarded to reduce a frame rate.

In one embodiment the number n is at least one of: greater than two; between two and five; between two and ten; between four and twenty five; less than twenty five; and, based on a number of available compression schemes.

In one embodiment the method includes: obtaining next image data for a next one of the n images; compressing the next image data; and, repeating steps a) and b) for each of the n images.

In one embodiment the method includes, for at least one of the n images: selecting one of a plurality of compression schemes; and, compressing the image data with the selected compression scheme to generate compressed image data.

In one embodiment the method includes: determining an encoding code indicative of the selected compression scheme; and, associating the encoding code with the compressed image data.

In one embodiment the method includes selecting the compression scheme in accordance with at least one of: compression schemes used for adjacent images in the sequence of n images; a desired degree of compression; a transmission bandwidth of a communications link used to transmit the compressed image data; a transmission quality of service of a communications link used to transmit the compressed image data; movement of a display device; predicted movement of a display device; image display requirements; a target display resolution; a channel being processed; a position of the array of pixels within the one or more images; and, a position of the array of pixels within the one or more images relative to a point of gaze of an observer of the one or more images; and, error metrics.

In one embodiment the method includes using at least one compression scheme to: obtain pixel data from the image data, the pixel data representing an array of pixels within the one or more images; determine a position of the array of pixels within the one or more images relative to a defined position, the defined position being at least partially indicative of a point of gaze of the user; and compress the pixel data at least partially in accordance the determined position so that a degree of compression depends on the determined position of the array of pixels.

In one embodiment the defined position is at least one of: a measured point of gaze of the user; an expected point of gaze of the user; offset from a measured point of gaze of the user; offset from an expected point of gaze of the user; and, determined at least partially in accordance with gaze data indicative of a point of gaze of the user, the gaze data being obtained from a gaze tracking system.

In one embodiment the method includes compressing the pixel data so that the degree of compression at least one of: is based on a distance from the defined point; is based on a direction relative to the defined point; increases further from the defined point; and, provides foveated compression.

In one embodiment the method includes using at least one compression scheme to: obtain pixel data from the image data, the pixel data representing an array of pixels within the one or more images; apply a transformation to the pixel data to determine a set of frequency coefficients indicative of frequency components of the array of pixels; selectively encode at least some of the frequency coefficients using a bit encoding scheme to thereby generate a set of encoded frequency coefficients; and, generate compressed image data using the encoded frequency coefficients.

In one embodiment the bit encoding scheme defines the number of bits used to encode each of the frequency coefficients, and wherein the frequency coefficients are selectively encoded so that at least one of: at least some of the encoded frequency coefficients have different numbers of bits; a smaller number of bits are used to encode frequency coefficients corresponding to higher frequencies; a progressively smaller number of bits are used to encode frequency coefficients corresponding to progressively higher frequencies; at least one frequency coefficient is discarded so that the set of encoded frequency coefficients is smaller than the set of frequency coefficients; and, at least one frequency coefficient is discarded corresponding to higher frequencies.

In one embodiment the method includes: selecting one of a plurality of bit encoding schemes; and, encoding the frequency coefficients in accordance with the selected bit encoding scheme.

In one embodiment each of the plurality of bit encoding schemes selectively encodes different frequency coefficients with respective different numbers of bits to provide a different degree of compression.

In one embodiment the bit encoding scheme is selected at least in part depending on at least one of: a desired degree of compression; and, the position of the array of pixels.

In one embodiment the frequency components are arranged in a plurality of levels and wherein each bit encoding scheme defines a respective number of bits to be used to encode the frequency coefficients in each of the plurality of levels.

In one embodiment the array is an N×N array of pixels resulting in 2N-1 levels of frequency components.

In one embodiment the method includes applying a scaling factor to at least some of the frequency coefficients so that scaled frequency coefficients are encoded, the scaling factor being used to reduce a magnitude of each frequency coefficient and wherein at least one of: different scaling factors are applied to at least some frequency coefficients; the same scaling factor is applied to each frequency coefficient; and, a different scaling factor is applied to frequency coefficients in a different channel.

In one embodiment the transformation is a 2-D discrete cosine transformation.

In one embodiment the method includes: selectively encoding frequency coefficients in parallel; and, generating compressed image data at least in part by parallel to serial byte encoding.

In one embodiment the image data defines a plurality of channels, and wherein the method includes using at least one compression scheme to selectively compress each of the plurality of channels.

In one embodiment the pixel data defines RGB channels, and wherein the method includes: converting the RGB channels into YCbCr channels; and, compressing the YCbCr channels, and wherein the method further includes at least one of: compressing the Y channel less than the Cb or Cr channels; compressing each of the YCbCr channels in parallel; and, compressing the CbCr channels and using an uncompressed Y channel.

In one embodiment the method includes: obtaining pixel data from the image data, the pixel data representing an array of pixels within the one or more images; and, compressing the pixel data, wherein the pixel data is obtained from the image data by: buffering image data corresponding to a next m-1 rows of pixels of the image; buffering image data for a next m pixels of the next row of pixels; obtaining pixel data for a next m×m block of pixels from the buffered image data; repeating steps b) and c) until pixel data has been obtained from all of the m rows of pixels; and, repeating steps a) to d) until pixel data has been obtained from each the row of pixels of the image.

In one embodiment m is selected based on at least one of: a selected compression scheme; a selected bit encoding scheme; a desired degree of compression; and, the position of the array of pixels.

In one embodiment the method is performed at least in part using an electronic processing device.

In one broad form an aspect of the present invention seeks to provide an apparatus for compressing image data from images forming part of a digital content stream, the apparatus including at least one electronic encoder processing device that: obtains image data for each of the n images; and, compresses the image data for at least some of the n images using a respective compression scheme.

In one embodiment the apparatus includes: an encoder input buffer that receives the image data; and, an encoder output buffer that stores compressed image data.

In one embodiment the apparatus includes an encoder transmitter that transmits the image data from the encoder output buffer.

In one embodiment the at least one encoder processing device includes: a suitably programmed field programmable gate array; an Application-Specific Integrated Circuit; and, a Graphics Processing Unit.

In one embodiment the image data defines a plurality of channels, and wherein the apparatus includes: a respective processing device for each channel; and, a parallel processing device for processing each channel in parallel.

In one embodiment the pixel data defines RGB channels, and wherein the apparatus: converts the RGB channels into YCbCr channels; and, use at least one processing device to selectively encode the YCbCr channels.

In one embodiment the apparatus includes an encoder in wireless communication with a decoder allowing image data to be transferred between the encoder and decoder as compressed image data.

In one embodiment the encoder is at least one of coupled to and part of a suitably programmed processing system.

In one embodiment the decoder is at least one of coupled to and part of a wearable display device.

In one embodiment the encoder and decoder communicate to exchange at least one of: compressed image data; movement data indicative of movement of a display device; control data that is used at least in part to control the display device; input data indicative of user input commands; gaze data indicative of a point of gaze of an observer; and, sensor data from sensors associated with a wearable display device.

In one broad form an aspect of the present invention seeks to provide a method of decompressing compressed image data representing images forming part of a digital content stream, the method including for a sequence of n images within the digital content stream: obtaining compressed image data for at least some of the n images; and, decompressing the compressed image data for each of the at least some of the n images using a respective decompression scheme.

In one embodiment the decompression scheme corresponds to a compression scheme used to generate the compressed image data.

In one embodiment the method includes selecting the respective decompression scheme in accordance with at least one of: a compression scheme code indicative of the compression scheme used to compress the image data; a desired degree of compression; a transmission bandwidth of a communications link used to transmit the compressed image data; a transmission quality of service of a communications link used to transmit the compressed image data; movement of a display device; predicted movement of a display device; image display requirements; a target display resolution; a channel being processed; a position of the array of pixels within the one or more images; and, a position of the array of pixels within the one or more images relative to a point of gaze of an observer of the one or more images; and, error metrics.

In one embodiment the method includes: obtaining next compressed image data for a next one of the n images; decompressing the next compressed image data; and, repeating steps a) and b) for each of the n images.

In one embodiment the method includes using at least one decompression scheme to: obtain compressed image data, the compressed image data representing an array of pixels within the one or more images and being compressed at least in part based on a position of the array of pixels within the one or more images relative to a defined position, the defined position being at least partially indicative of a point of gaze of the user; and, decompress the compressed image data at least partially in accordance the determined position.

In one embodiment the defined position is at least one of: a measured point of gaze of the user; an expected point of gaze of the user; offset from a measured point of gaze of the user; offset from an expected point of gaze of the user; and, determined at least partially in accordance with gaze data indicative of a point of gaze of the user, the gaze data being obtained from a gaze tracking system.

In one embodiment the method includes decompressing the pixel data so that the degree of decompression at least one of: is based on a distance from the defined point; is based on a direction relative to the defined point; increases further from the defined point; and, provides foveated compression.

In one embodiment the method includes using at least one decompression scheme to duplicate an image to recover a frame rate for a discarded image.

In one embodiment the method includes using at least one decompression scheme to: determine a set of encoded frequency coefficients from the compressed image data in accordance with a bit encoding scheme that defines the number of bits used in each encoded frequency coefficient; performing bit decoding of the encoded frequency coefficients in accordance with the bit encoding scheme to thereby generate a set of frequency coefficients, wherein at least one frequency coefficient is generated so that the set of encoded frequency coefficients is smaller than the set of frequency coefficients; and, applying an inverse transformation to the set of frequency coefficients to determine pixel data representing an array of pixels within the one or more images.

In one embodiment the bit encoding scheme defines the number of bits used to encode each of the frequency coefficients, the bit encoding scheme uses a smaller number of bits to encode frequency coefficients corresponding to higher frequencies and wherein the method includes generating at least some of the frequency coefficients corresponding to higher frequencies.

In one embodiment the method includes: selecting one of a plurality of bit encoding schemes; and, decoding the encoded frequency coefficients in accordance with the selected bit encoding scheme.

In one embodiment each of the plurality of bit encoding schemes selectively encodes different frequency coefficients with respective different numbers of bits to provide a different degree of compression.

In one embodiment the bit encoding scheme is selected at least in part depending on at least one of: an encoding code; the bit encoding scheme used to generate the compressed image data; and, the position of the array of pixels.

In one embodiment the frequency components are arranged in a plurality of levels and wherein each bit encoding scheme defines a respective number of bits to be used to encode the frequency coefficients in each of the plurality of levels.

In one embodiment the array is an N×N array of pixels resulting in 2N-1 levels of frequency components.

In one embodiment the method includes applying a scaling factor to at least some of the frequency coefficients so that scaled encoded frequency coefficients are decoded, the scaling factor being used to increase a magnitude of each frequency coefficient and wherein at least one of: different scaling factors are applied to at least some encoded frequency coefficients; the same scaling factor is applied to each encoded frequency coefficient; and, a different scaling factor is applied to encoded frequency coefficients in a different channel.

In one embodiment the inverse transformation is an inverse 2-D discrete cosine transformation.

In one embodiment the method includes: decoding compressed image data at least in part by serial to parallel byte decoding; and, selectively decoding frequency coefficients in parallel.

In one embodiment the image data defines a plurality of channels, and wherein the method includes selectively decoding encoded frequency coefficients for each channel.

In one embodiment the compressed image data defines YCbCr channels, and wherein the method includes: performing an inverse transform of the YCbCr channels; and, converting the transformed YCbCr channels into RGB channels and wherein the method further includes at least one of: decompressing the Cb or Cr channels more than the Y channel; decompressing the encoded YCbCr channels in parallel; and, decompressing the CbCr channels and converting the decompressed CbCr channels and the Y channel into RGB channels.

In one embodiment the method is performed at least in part using an electronic processing device.

In one broad form an aspect of the present invention seeks to provide an apparatus for decompressing image data from images forming part of a digital content stream, the apparatus including at least one electronic decoder processing device that: obtaining compressed image data for at least some of the n images; and, decompressing the compressed image data for each of the at least some of the n images using a respective decompression scheme.

In one embodiment the apparatus includes: a decoder input buffer that receives the compressed image data; and, a decoder output buffer that stores the image data.

In one embodiment the apparatus includes a decoder transceiver that receives the compressed image data and provides the compressed image data to the input buffer.

In one embodiment the at least one decoder processing device includes: a suitably programmed field programmable gate array; an Application-Specific Integrated Circuit; and, a Graphics Processing Unit.

In one embodiment the image data defines a plurality of channels, and wherein the apparatus includes: a respective processing device for each channel; and, a parallel processing device for processing each channel in parallel.

In one embodiment the compressed image data defines YCbCr channels, and wherein the apparatus: uses respective processing devices to decode the CbCr channels; and, converts the decoded YCbCr channels into RGB channels.

In one embodiment the apparatus includes an encoder in wireless communication with a decoder allowing image data to be transferred between the encoder and decoder as compressed image data.

In one embodiment the apparatus includes a decoder in wireless communication with an encoder allowing image data to be transferred between the encoder and decoder as compressed image data.

In one embodiment the decoder is at least one of coupled to and part of a suitably programmed computer system.

In one embodiment the decoder is at least one of coupled to and part of a wearable display device.

In one embodiment the decoder and encoder communicate to exchange at least one of: compressed image data; movement data indicative of movement of a display device; control data that is used at least in part to control the display device; input data indicative of user input commands; gaze data indicative of a point of gaze of an observer; and, sensor data from sensors associated with a wearable display device.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which.

DETAILED DESCRIPTION OF THE PREFERRED EMBODIMENTS

Figure 1:
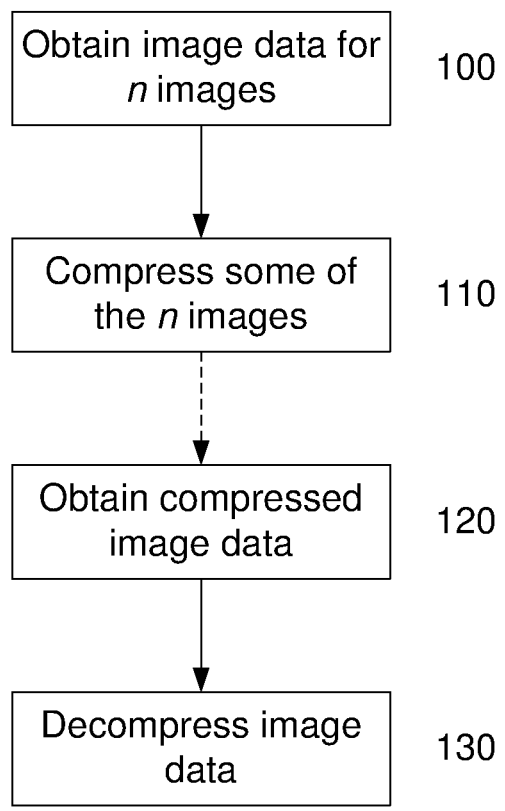
FIG. 1 is a flow chart of an example of a method for compressing and subsequently decompressing image data forming part of a digital content stream.

An example of a method for compressing and subsequently decompressing image data forming part of a digital content stream will now be described with reference to FIG. 1.

For the purpose of illustration, it is assumed that the process is performed at least in part using one or more electronic processing devices. In one example, respective processing devices are used for compressing and decompressing the image data, allowing compressed image data to be transferred between the two processing devices, although this is not essential and alternatively the same processing device can be used for compressing and decompressing the image data.

The processing devices could form part of respective processing systems, such as computer systems, computer servers, client devices, including mobile phones, portable computers, display devices, such as wearable or head mounted displays, or alternatively could be in the form of independent modules, coupled to such devices.

The image data represents a sequence of images forming part of a digital content stream, which in one example is displayed remotely to a source as part of a digital reality system, such as in virtual, augmented or mixed reality graphics application in which images are displayed on a wearable display, and/or in telepresence applications, in which images are displayed from a remote controllable system. However, it will be appreciated that whilst the techniques described herein are particularly useful for digital reality applications, the term digital content stream is not intended to be limiting, and the techniques could be used for any content stream, such as a video stream, computer graphics, or the like.

In this example, at step 100 image data is obtained for each of n images (where n is an integer) forming part of a digital content stream. The image data can be obtained in any appropriate manner and could be retrieved from a data store, received from a remote source, such as a computer system, server, video capture device, video source, or the like. This could include live streaming video from a camera, such as a drone mounted camera, or the like. Alternatively the image data could be generated internally within the electronic processing device, for example as part of a mixed, augmented or virtual reality system.

At step 110, the image data for at least some of the n images is compressed using a respective compression scheme. In this regard, typically a different compression scheme is used for at least some of the n images, so that at least some of the images are compressed in a different manner. The different compression schemes could provide a different degree of compression, including lossy and/or lossless compression, and might also use different compression mechanisms, for example compressing different colour space channels within different images, performing block encoding, or the like. Thus, a wide range of different image compression algorithms could be used, and reference to specific examples in the following description is not intended to be limiting. It will also be noted that at least some of the images in the sequence of n images could be uncompressed.

It will be appreciated that the above described process could involve receiving each of the n images, and then performing the compression, but particularly in situations where latency is an issue, typically each image will be compressed substantially immediately as soon as it is received, so that steps of obtaining and compressing the images are repeated sequentially for each of the n images.

Similarly, in terms of the decompression process, compressed image data is obtained at step 120 for at least some of the n images, optionally together with image data from any uncompressed images. The compressed and optionally uncompressed image data could be obtained in any appropriate manner and could be received from a remote source, such as an electronic processing device used to perform the compression, retrieved from a data store, or the like.

The compressed image data is then decompressed at step 130, using a respective decompression scheme and optionally combined with any uncompressed image data, to form an uncompressed digital content stream, which can then be displayed as required.

Accordingly, the above described methodology provides a mechanism for compressing and subsequently decompressing a sequence of n images within a video content stream, using different compression/decompression schemes for at least some of the images, and optionally encoding some of the images with no, minimal or lossless compression.

In this regard, compression of images is typically performed in order to minimise the volume of the resulting data, for example allowing this to be stored using less storage space, or transmitted using lower bandwidths. However, compression can lead to a loss of information in the images, in turn resulting in a loss of image quality and/or introduction of compression artefacts, such as ringing, contouring, posterizing, staircase noise, aliasing, blockiness, or the like.

In typical video compression schemes compression is performed collectively across multiple frames. For example, temporal redundancy is used to take into account the fact that sequential frames are often very similar, and hence compression schemes such as MPEG-4 only encode the difference between successive frames, using motion estimation to find the difference between frames. This helps increase the degree of compression that can be performed, whilst minimising the presence of artefacts. However, for such schemes to operate optimally, it is preferable to have knowledge of the content of multiple image frames prior to commencing compression. As a result this is not generally suitable for digital reality schemes in which low latency requirements often require that each frame is compressed as rapidly as possible, meaning this is done substantially as soon as the frame is generated, and before successive frames are generated, meaning it is difficult to use temporal redundancy.

In contrast the above approach uses different compression approaches for different images within the sequence. For example, this could include compressing a sequence of five images using a lossless compression scheme for the first image, followed by four lossy compression schemes for the next four images, such as using run-length encoding, followed by colour space reduction, chroma subsampling, transform coding, fractal compression or the like.

The different compression schemes typically have different resulting qualities, and often have different compression artefacts, meaning specific artefacts are often only present in one or two images within the sequence. As each image is only viewed for a short duration of time, such as 0.04 seconds or less, the artefacts become less noticeable to the viewer. Furthermore as humans tend to perceive video content collectively across frames, viewers of the decompressed content will tend to perceive the quality collectively across the sequence of images, rather than noticing a reduction in quality on individual images. This means that as long as some of the images in the sequence have a sufficiently high quality, the user will typically not perceive a reduction in overall quality, nor will they identify specific compression artefacts if these are only limited to some of the images. Additionally, artefacts between images can be further reduced by performing blending between frames, for example to reduce flicker in pixels at a certain frequency.

Consequently, compressing a sequence of images, such as a number of video and computer graphics frames, with different compression algorithms can be used to obtain a high degree of compression, with less of a perceived reduction in quality than would otherwise by the case. This also significantly minimises the impact of compression artefacts by ensuring that similar artefacts are not present in multiple sequential images, thereby significantly reducing the extent to which such artefacts are perceived. Additionally, this approach allows each frame within the digital content stream to be compressed individually, which in turn makes this particularly suited for applications requiring a low latency, such as digital reality applications.

A number of further features will now be described.

In one example, the method includes compressing the sequence of n images using a sequence of compression schemes, optionally using the same sequence of compression schemes for multiple sequences of n images. Using a defined sequence of compression schemes can assist in decompression, for example only requiring that the first image in a sequence is identified, allowing the electronic processing device to automatically determine the decompression schemes to be used for the remaining images. Additionally, the compression schemes can be ordered to minimise the perceived reduction in image quality, for example by interspersing highly compressed images with minimally compressed images, or by ensuring sequential compression schemes do not result in similar compression artefacts.

However, it will be appreciated that this is not essential, and alternatively, one of a plurality of compression schemes could be selected for each image to be compressed, with the image data being compressed using the selected compression scheme to generate compressed image data.

In this example, the compression scheme can be selected based on a range of factors including, but not limited to compression schemes used for adjacent images in the sequence of n images, a desired degree of compression, a transmission bandwidth of a communications link used to transmit the compressed image data, a transmission quality of service of a communications link used to transmit the compressed image data, movement of a display device, predicted movement of a display device, image display requirements, a target display resolution, a channel being processed, a position of the array of pixels within the one or more images, a position of the array of pixels within the one or more images relative to a point of gaze of an observer of the one or more images, error metrics or the like. This allows one or more compression schemes to be selected so as to ensure that sufficient compression is achieved, whilst maintaining the overall quality of the digital content stream.

It will be appreciated that a suitable decompression scheme could be selected in a similar manner. In this regard, the decompression scheme used typically corresponds to a compression scheme used to generate the compressed image data thereby ensuring the compressed image data is accurately decompressed. To ensure this occurs, the same selection process can be used to select a decompression scheme so that this corresponds to the compression scheme used to compress the image. In this regard, if the same factors are used in the selection process, the same selection should result. However, in another example, an encoding code indicative of the selected compression scheme could be determined during the compression process and associated with the compressed image data, allowing the compressed image data to be subsequently decompressed using an associated decompression scheme. This allows a processing device receiving the compressed image data to determine the encoding code and use this to identify a decompression scheme associated with the compression scheme.

Typically different compression schemes are selected so that at least two of the respective compression schemes provide a different degree of compression, although this is not essential. More typically, each of the n images are compressed using a different compression scheme, with these optionally each providing a different degree of compression. Again this is not essential, and at least two images in the sequence of n images can be compressed using a common compression scheme. In any event, at least one of the n images is generally compressed using a different compression scheme to each adjacent image, to assist in ensuring image artefacts are not contiguous across multiple images. The compression schemes could include lossless or lossy compression schemes, and preferably at least one lossless compression scheme, or at least one uncompressed image is used to maximise perceived image quality across the entire sequence of images. In a further example, at least one of the n images can be discarded to reduce a frame rate, in which case a previous image can be replicated during compression to recover the frame rate, whilst reducing the amount of data transmitted.

For example, when a user's head moves at a rapid pace, a much greater refresh rate (frame rate) is required to maintain a desirable, low persistence video image. During head movement however, the user's eyes will not perceive the same image detail and the image can be compressed significantly more. In contrast, when the user's head is stationary or moving very slowly, the user perceives a lot more detail in the image, so a lower amount of compression is desirable, whereas a high frame rate is less important and therefore could be lowered because there is not much movement. Accordingly, it will be appreciated that in this instance there can be a trade-off between the level of compression applied to each frame and the omission of frames, with frames (images) being retained but with high overall compression when the headset is moving, whilst frames (images) can be omitted when the headset is relatively stationary, with the remaining frames having a lower level of compression to maintain better image quality.

In one example, an inertial prediction algorithm can be used above a traditional proportional-integral-derivative (PID) controller loop to attempt to predict future inertial movement of the head. For example the neck has physical limitations and certain muscles accelerate and decelerate in different ways and present different ranges of motion to how a user might turn using their hips and/or feet. Additionally, a likely degree of movement could be predicted based on the content being presented. In any event, it will be appreciated that predicting the movement that might occur can be used to control the compression schemes used to compress the images, in particular controlling both changes in compression and frames dropped/retained in a manner where it changes dynamically to achieve both a consistently desirable compression ratio as well as visual experience.

The number n of images in the image sequence can vary depending on the preferred implementation, but in one example, the number n is greater than two, between two and five, between two and ten, between four and twenty five, or less than twenty five. This can be used to ensures that an uncompressed or losslessly compressed image is presented one or more times a second, which in turn can assist in maintaining perceived content quality. Alternatively however, the number n can be based on a number of available compression schemes, thereby reducing duplication of compression schemes within the image sequence.

In one example, the method includes obtaining next image data for a next one of the n images, compressing the next image data and then repeating these steps for each of the n images in the sequence and then optionally for each of a number of sequences. In this instance, the image data for each image is compressed sequentially, which is particularly beneficial for low latency requirements. A similar approach is typically used for decompression, with the process involving obtaining next compressed image data for a next one of the n images, decompressing the next compressed image data and repeating these steps for subsequent images. However, this is not essential, and alternatively a number of images could be obtained, with these then being compressed. This could be used to allow temporal redundancy to be employed as one or more of the compression techniques, further increasing the degree of compression that can be performed.

It will be appreciated that the above described techniques can be performed using a number of different compression schemes, and examples will now be described in more detail.

In one example, the compression scheme performs foveated compression, in which the image is differentially compressed based on what part of the image the user is viewing or is expected to view. In this example, the method includes obtaining pixel data from the image data, with the pixel data representing an array of pixels within the one or more images and determining a position of the array of pixels within the one or more images relative to a defined position, with the defined position being at least partially indicative of a point of gaze of the user. The defined position can be based on an actual measured point of gaze, or an expected or predicted point of gaze of the user, determined for example by assuming the user is staring at an approximate centre of the image, or based on the content, such as a point of focus within the image, movement of the headset, or the like. Additionally, the defined point can be offset from the point of gaze, for example positioning this below the point of gaze to take account of the fact that individuals tend to perceive more detail slightly below the point of gaze to avoid colliding with obstacles when walking. Following this, the pixel data is compressed at least partially in accordance the determined position, so that a degree of compression depends on the determined position of the array of pixels.

It will be appreciated that similarly a decompression process can be performed that involves obtaining compressed image data, the compressed image data representing an array of pixels within the one or more images and being compressed at least in part based on a position of the array of pixels within the one or more images relative to a defined position, the defined position being at least partially indicative of a point of gaze of the user and decompressing the compressed image data at least partially in accordance the determined position.

Thus, this provides a mechanism for compressing and subsequently decompressing the image, with the compression being controlled based on the location of an array of pixels relative to a defined point, which is in turn at least partially based on either a predicted or measured point of gaze of the user. Specifically this allows a degree of compression to be selected based on the position of the array of pixels, so that, less compression can be used in a region proximate the point of gaze, whilst greater compression is used further from the point of gaze, for example in the users peripheral field of view. This in effect provides foveated compression, allowing greater overall compression to be achieved, without a perceptible loss in quality, by increasing the compression in the user's peripheral field of view where a reduced quality of image is less noticeable.

The degree of compression can be based on a distance from the defined point, for example progressively decreasing further from the point of gaze, but can also be based on a direction relative to the defined point, so that compression is greater above or below the defined point. It will be appreciated that this allows a respective degree of compression to be used in regions having any arbitrary shape positioned relative to the point of gaze, and that this could be configured depending on the particular circumstances and/or nature of the content being compressed. For example, this allows an elliptical, ovoid, or heart shaped region surrounding the defined point to have a reduced amount of compression compared to peripheral regions, to thereby maximise the image quality in regions where the user's perception of any compression artefacts will be greater.

In one example, the compression scheme compresses image data by applying a transformation to the pixel data to determine a set of frequency coefficients indicative of frequency components of the array of pixels, selectively encodes at least some of the frequency coefficients using a bit encoding scheme to thereby generate a set of encoded frequency coefficients and generates compressed image data using the encoded frequency coefficients.

In this example, the bit encoding scheme can define the number of bits used to encode each of the frequency coefficients so that at least some of the encoded frequency coefficients have different numbers of bits. This process is typically performed in order to reduce the number of bits used to encode frequency coefficients, to thereby minimise the number of bits required to encode the frequency coefficients. This could include encoding some of the frequency coefficients with zero bits, thereby effectively discarding the respective frequency coefficients as part of the encoding step.

The number of bits used is typically smaller for higher frequency components as their magnitude is smaller and as these correspond to sharp transitions within images, meaning their contribution to the overall image quality is less. This allows higher frequency component coefficients to be encoding using less bits, or even discarded without adversely effecting perceived image quality in a noticeable manner, whilst reducing the overall number of bits required to encode the frequency coefficients.

It should be noted that this approach should be contrasted to a code substitution technique, such as Huffman encoding, in which values are substituted for shorter codes. Instead, in this example the values are still encoded, albeit using a number of bits appropriate to the expected magnitude of the value, so if it expected that the value of the frequency coefficient would not exceed seven, then this could be encoded as a three bit word, so six would be encoded as "110", as opposed to using a default eight bit word "00000110". In contrast, if it is expected that the value of the frequency coefficient is up to sixty three, a six bit word could be used, so for example, twenty could be encoded "010100". In the event that the value exceeds the available number of bits, then the maximum value available for the define number of bits could be used, in turn resulting in a loss of accuracy in the resulting compressed image data.

Thus, the bit encoding scheme uses information regarding the expected size of the frequency coefficient values in order to define the number of bits that should be used. A less aggressive bit encoding scheme will use a greater number of bits, resulting in reduced compression, but with a greater resolution, whereas a more aggressive bit encoding scheme will use few bits, and hence provide greater compression, but with a trade off in reduced resolution.

In any event, by using a bit encoding scheme that defines the number of bits used to encode each frequency coefficient, this allows the same scheme to be used in decompressing the compressed image data, in turn allowing accurate decompression to be performed, whilst allowing the bit encoding scheme used to be configured to optimise the compression for the current situation.

In one example, the method includes selecting one of a plurality of bit encoding schemes and encoding the frequency coefficients in accordance with the selected bit encoding scheme. In this regard, it will be appreciated that this in effect provides different compression schemes, with each compression scheme using the same basic approach but a different bit encoding scheme.

The bit encoding scheme can be selected at least in part depending on a desired degree of compression and/or the position of the array of pixels. This, can in turn depend on other factors, such as the position of the array of pixels, a transmission bandwidth of a communications link used to transmit the compressed image data, a transmission quality of service of a communications link used to transmit the compressed image data, movement of a display device, image display requirements, a target display resolution, a channel being processed, error metrics, or the like. This allows for the ability to dynamically adjust the compression to help optimise the compression and obtain the best possible image quality for the current circumstances.

For example, in the case of movement of the display device, feedback from a head tracking system can be provided to the encoding algorithm, allowing the encoding algorithm to select the compression scheme on the basis of head acceleration information, allowing the compression algorithm to make dynamic adjustment to both frame-rate and amount of compression. Such movement feedback data could read out from an internal IMU (Inertial Measurement Unit) within the HMD or a secondary one, for example forming part of a decoder or separate system.

In one example, the frequency components are arranged in a plurality of levels and wherein each bit encoding scheme defines a respective number of bits to be used to encode the frequency coefficients in each of the plurality of levels. In particular, where the array is an N×N array of pixels, this results in 2N-1 levels of frequency components, with the components in each level being encoded with a respective number of bits.

In one example, the method includes applying a scaling factor to at least some of the frequency coefficients so that scaled frequency coefficients are encoded. In this regard, scaling is used to reduce the magnitude of the frequency coefficients, so that these can be encoded using a smaller number of bits. A similar scaling factor can be applied when decompression is performed, thereby scaling the respective frequency components back to their original magnitude. During this process, rounding is typically performed so that the scaled frequency component is an integer value, or has a limited number of significant figures, thereby minimising the number of bits used to encode the coefficients. It will be appreciated that when this is performed, there is a resulting reduction in accuracy of the recreated frequency components, but that the effect of this on the resulting image quality is negligible.

When a scaling factor is used, the same scaling factor can be applied to each frequency coefficient. This is particularly advantageous as this reduces the computational burden in performing the scaling. In particular, this allows a single scaling factor to be read from memory, such as a register, or allowing this be hard coded within logic configurations, thereby making the process of scaling the frequency coefficients more rapid. However, this is not essential, and different scaling factors can be applied to different frequency coefficients, for example to scale frequency coefficients for higher frequencies by a greater amount.

The transformation is typically a frequency transformation, such as a Fourier transform, or the like and in one example is a 2D DCT (Discrete Cosine Transform). The transformation could be applied in any suitable manner, for example using known transformation techniques, but in one example is performed in a highly parallel manner, thereby reducing the processing time.

In one example, the image data defines a plurality of channels, with the method including selectively encoding each channel. By encoding different channels individually, this allows different channels to be encoded differently, for example using different bit encoding schemes, or discarding different frequency coefficients, in the above described compression scheme. Additionally, compressing channels independently allows channels to be compressed in parallel, which can significantly assist in reducing the time taken to perform compressing and hence reduce latency.

In one example, the pixel data defines RGB channels, and the method includes converting the RGB channels into luminance and chrominance channels YCbCr and transforming the YCbCr channels. In this regard, luminance and chrominance channels are perceived differently by the human eye, allowing chrominance channels to be compressed using a greater degree of compression and hence a reduction in quality compared to the luminance channel, without a resulting loss in perceived quality. Thus, in one example, the method can include selectively encoding more frequency coefficients for the Y channel than the Cb or Cr channels, and similarly can include selectively encoding frequency coefficients for the Y channel with more bits than for the Cb and Cr channels.

In a further example, where the pixel data defines RGB channels, the method can includes converting the RGB channels into YCbCr channels and generating the compressed image data by compressing the CbCr channels and using the Y channel. Thus, the Y channel is effectively uncompressed, meaning the entire information contained within the luminance channel is retained. This can be particularly useful in some scenarios, for example when encoding pixel arrays showing a gradient, as this can help preserve the colour variations and hence improve image quality, whilst resulting in only a minor decrease in compression.

As mentioned above, the different channels can be compressed in parallel. Additionally, the frequency coefficients with each channel can be encoded in parallel. In this case, the method of generating compressed image data typically includes performing parallel to serial byte encoding, so that the frequency coefficients are serialised into a byte stream, which can then undergo byte encoding.

In one example, the compression scheme involves buffering image data to obtain pixel data by buffering image data corresponding to a next m-1 rows of pixels of the image, buffering image data for a next m pixels of the next row of pixels, obtaining pixel data for a next m×m block of pixels from the buffered image data, and repeating this until repeating until pixel data has been obtained from all of the m rows of pixels and further repeating this for all rows of pixels of the image.

The value of m can be used to define a degree of compression and could be selected based on a selected compression scheme, a selected bit encoding scheme, a desired degree of compression and/or the position of the array of pixels.

Similar approaches can be used for decompressing the compressed image data.

For example, the decompression scheme could involve obtaining compressed image data, the compressed image data representing an array of pixels within the one or more images and being compressed at least in part based on a position of the array of pixels within the one or more images relative to a defined position, the defined position being at least partially indicative of a point of gaze of the user and decompressing the compressed image data at least partially in accordance the determined position.

The defined position could be a measured point of gaze of the user, an expected point of gaze of the user, offset from a measured point of gaze of the user, offset from an expected point of gaze of the user and determined at least partially in accordance with gaze data indicative of a point of gaze of the user, the gaze data being obtained from a gaze tracking system. The degree of decompression can then be based on a distance from the defined point, based on a direction relative to the defined point, increase further from the defined point and provide foveated compression.

The decompression scheme can determine a set of encoded frequency coefficients from the compressed image data in accordance with a bit encoding scheme that defines the number of bits used in each encoded frequency coefficient, perform bit decoding of the encoded frequency coefficients in accordance with the bit encoding scheme to thereby generate a set of frequency coefficients, wherein at least one frequency coefficient is generated so that the set of encoded frequency coefficients is smaller than the set of frequency coefficients and apply an inverse transformation to the set of frequency coefficients to determine pixel data representing an array of pixels within the one or more images.

In this example, the bit encoding scheme again defines the number of bits used to encode each of the frequency coefficients, the bit encoding scheme uses a smaller number of bits to encode frequency coefficients corresponding to higher frequencies and wherein the method includes generating at least some of the frequency coefficients corresponding to higher frequencies.

The bit encoding scheme can be selected from one of a plurality of bit encoding schemes, with the plurality of bit encoding schemes selectively encoding different frequency coefficients with respective different numbers of bits to provide a different degree of compression/decompression. The bit encoding scheme is typically selected based on an encoding code, the bit encoding scheme used to generate the compressed image data or the position of the array of pixels.

A scaling factor may also be applied to at least some of the frequency coefficients so that scaled encoded frequency coefficients are decoded, the scaling factor being used to increase a magnitude of each frequency coefficient, and with different scaling factors being applied to at least some encoded frequency coefficients, or the same scaling factor is applied to each encoded frequency coefficient, or a different scaling factor being applied to encoded frequency coefficients in a different channel.

In this case, the inverse transformation is typically an inverse 2-D discrete cosine transformation, although other suitable transforms could be used depending on the preferred implementation.

The compressed image data typically includes a plurality of channels, and wherein the method includes selectively decompressing each channel. In one example, the compressed image data defines YCbCr channels, and wherein the method includes performing an inverse transform of the YCbCr channels and converting the transformed YCbCr channels into RGB channels. As part of this process, the Cb or Cr channels may be decompressed more than the Y channel, optionally with the Y channel being uncompressed, and with the channels being processed in parallel.

The decompressed data may also undergo further processing, such as using a deblocking filter, which is used for smoothing the sharp edges which can form between macroblocks when block coding techniques or the like used. This in turn can allow an increased degree of compression to be used, whilst avoiding a corresponding reduction in image quality.

Additionally, the decompressed data can be processed in order to counteract the effects of transmission drop-outs or the like. For example data from a previous frame could be buffered, and redisplayed in the next frame becomes corrupted during transmission. This could include replacing the entire frame, or alternatively simply replacing individual blocks of pixels, if an individual pixel block becomes corrupted.

The techniques can be used for transmitting digital reality content, including any one or more of augmented reality, virtual reality, mixed reality, telepresence or the like. This can include transmitting the image data from a computing device to a wearable digital reality headset via a wired connection, communication network and/or a wireless communications link. This could include transferring compressed images wirelessly from a computer or other similar device, or could include transferring compressed images from a cloud based computing environment to a local device, such a headset mounted smart phone, allowing creation of images to be performed using cloud computing. Examples of suitable connections, include a hardwired gigabit internet, streaming to mobile phones, for example via mobile communications networks, such as 3G, 4G or 5G networks, transmitting via a wired connection to a tethered HMD, or via a wireless connection to an untethered HMD, or the like. It will also be appreciated that the minimal latency provided by the approach is ideally suited for transmission from live cameras, such as drone mounted cameras, or the like.

Figure 2A:
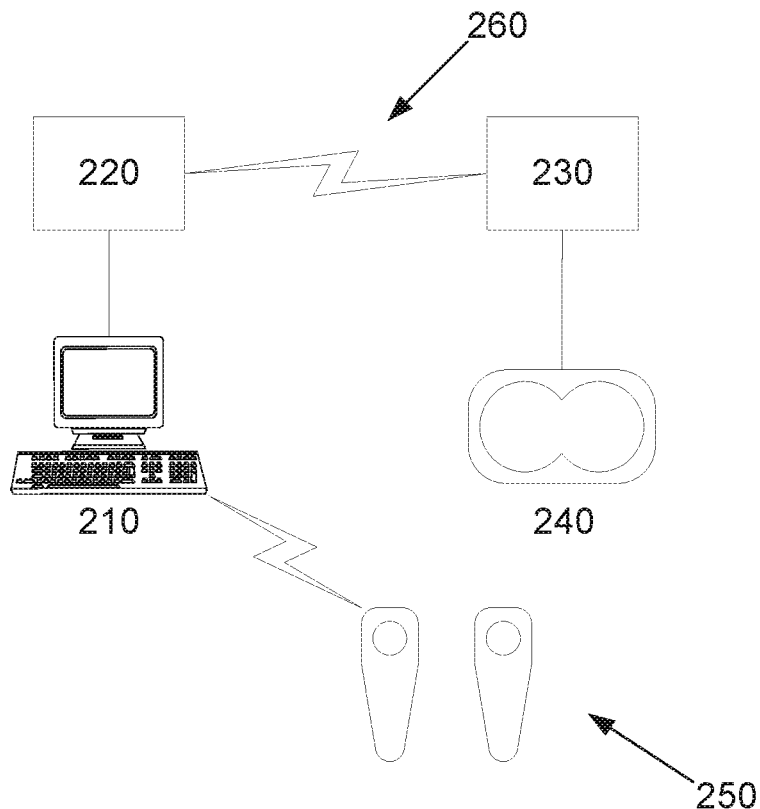
FIG. 2A is a schematic diagram of a first example of an apparatus for displaying images on a wearable device.

In one example, the apparatus includes an encoder and decoder in wireless communication, allowing image data to be transferred between the encoder and decoder as compressed image data. In one particular example, this can be utilised in order to provide wireless communication between a wearable display device, such as an HMD and a processing system. An example of this will now be described with reference to FIG. 2A.

In this example, a processing system 210, such as a suitably programmed computer system, gaming console, or the like, is adapted to generate content for display on an HMD 240. The processing system 210 typically achieves this by receiving sensor data from the HMD regarding the pose of the HMD, and optionally input data from one or more separate controller 250. The processing system 210 then generates content based on the sensor and/or input data, typically in the form of video data, which can be output from a video card or the like. The video data is transferred to an encoder 220, which encodes the video data by compressing the image data, before wirelessly transferring the compressed image data to the decoder 230, via a wireless communications link 260. The decoder 230 decodes the compressed image data, and provides the resulting video data to the HMD for display.

It will be appreciated that this arrangement allows for existing computer systems, gaming consoles or the like and HMDs 210, 240, to be connected via a wireless connection 260, thereby obviating the need for a wired connection between the processing system 210 and HMD 240. Thus, for example, a user could wear an HMD and associated decoder, and then connect the encoder to their computer system or gaming console, allowing a wireless HMD arrangement to be provided.

Figure 2B:
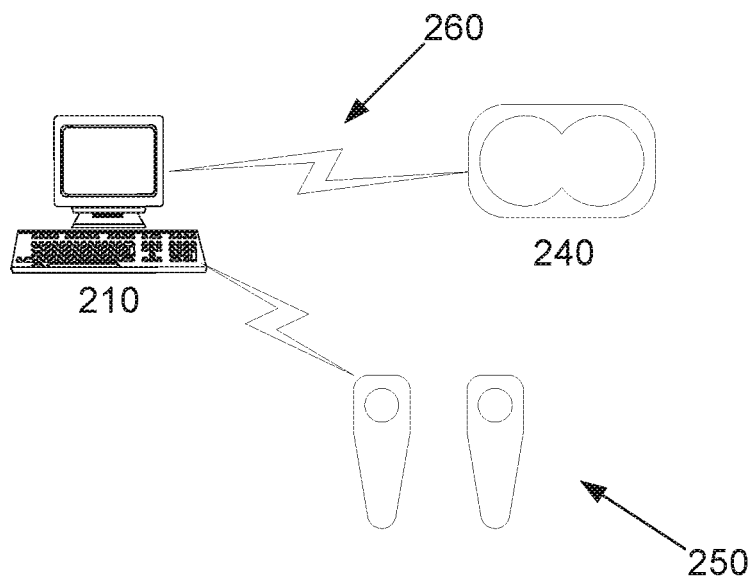
FIG. 2B is a schematic diagram of a second example of an apparatus for displaying images on a wearable device.

However, this is not essential, and alternatively, the processing system 210 and HMD 240 can be configured to include integrated encoder and decoder hardware, allowing these to communicate via a direct wireless connection 260, as shown in FIG. 2B.

Figure 3:
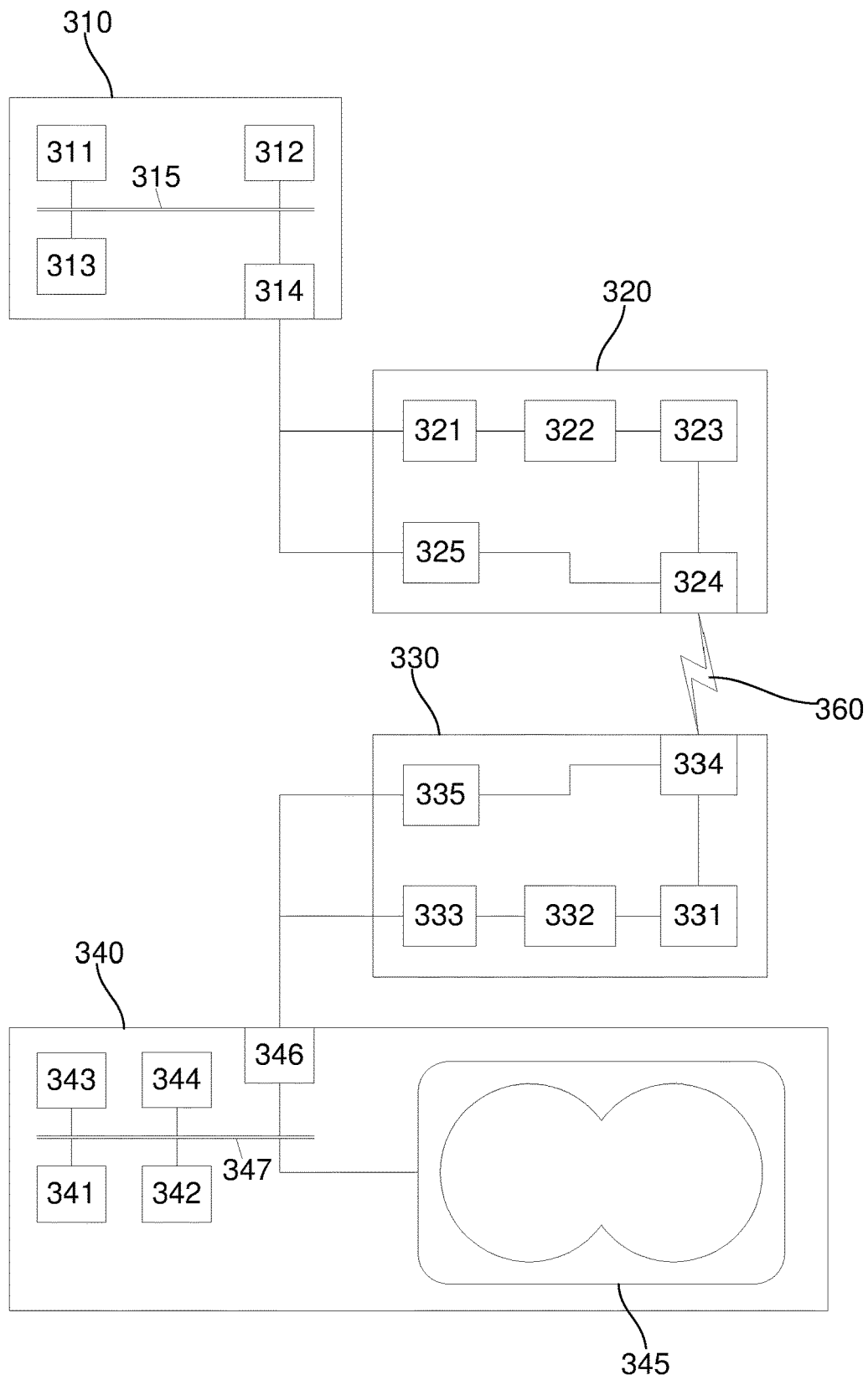
FIG. 3 is a schematic diagram of a specific example of a virtual reality system incorporating apparatus for compressing and decompressing image data.

An example of the hardware configuration will now be described in more detail with reference to FIG. 3.

This example will be illustrated with respect to a separate hardware encoder and decoder, but it will be appreciated that this is not essential and the same techniques could be used in conjunction with integrated hardware. Furthermore, whilst reference to made to virtual reality applications, again this is not essential and the techniques could be used to apply to any circumstance in which image data forming part of a content stream is to be transferred, and in particular when a content stream is to be transferred using a limited bandwidth, whilst maintaining an acceptable image quality and desired latency, such as in virtual reality, augmented reality, mixed reality, or telepresence applications.

In this example, the apparatus again includes a processing system 310, encoder 320, decoder 330 and a display device 340, in the form of an HMD or similar. Each of these components will now be described in more detail.

In this example, the processing system 310 includes at least one microprocessor 311, a memory 312, an optional input/output device 313, such as a keyboard and/or display, and an external interface 314, interconnected via a bus 315 as shown. In this example the external interface 314 can be utilised for connecting the processing system 310 to peripheral devices, such as communications networks, storage devices, peripherals, or the like. Although a single external interface 314 is shown, this is for the purpose of example only, and in practice multiple interfaces using various methods (eg. Ethernet, serial, USB, wireless or the like) may be provided. In this particular example, the external interface includes at least a data connection, such as USB, and video connection, such as DisplayPort, HMDI, Thunderbolt, or the like.

In use, the microprocessor 311 executes instructions in the form of applications software stored in the memory 312 to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed PC, or the like. In one particular example, the processing system 310 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), an Application-Specific Integrated Circuit (ASIC), a Graphics Processing Unit (GPU,) or any other electronic device, system or arrangement.

Furthermore, whilst the processing system 310 is shown as a single entity, it will be appreciated that in practice the processing system 310 could be formed from multiple physical devices, which can optionally be distributed over a number of geographically separate locations, for example as part of a cloud based environment.

The encoder 320 typically includes an encoder input buffer 321, coupled in turn to an encoder processing device 322, an encoder output buffer 323, and a transceiver 324. A separate data buffer 325 can be provided coupled to the transceiver 324.

In use, image data, and in one particular example, video data is received and temporarily stored in the input buffer 321, before being passed to the encoder processing device 322 for compression. In this regard, the encoder input buffer typically buffers image data corresponding to a next m-1 rows of pixels of the image, and then a next m pixels of the next row of pixels. This allows the encoder processing device 322 to obtain pixel data for a next m×m block of pixels from the buffered image data, and commence encoding. It will be appreciated however that this is not essential and other buffering schemes could be used, including buffering previous frames, for use in encoding differences between subsequent frames.

Once this has been done a next m pixels are buffered, with this being repeated until pixel data from the first m rows of pixels has been obtained and is being encoded. This process is then repeated for subsequent rows of pixels in the image, until pixel data is acquired for the entire image, at which point a next image is processed in a similar manner. As a result of this approach, the encoder input buffer need never store more than m-1 complete rows and m pixels of image data from the next row, reducing memory requirements. Additionally, as pixel data is acquired, this can be immediately processed using the encoding process, even before the next m pixels of image data are buffered. This significantly reduces processing time and helps minimise overall latency.

The resulting compressed image data is then stored in the encoder output buffer 323, for example by sequentially reading in encoded bits, to thereby perform parallel to serial byte encoding, before being transferred to the decoder 330, via the transceiver 324. The transceiver 324 is also adapted to transfer other data, such as a sensor data received from the HMD 340, via the encoder data buffer 325.

The buffers 321, 323, 325 can be of any appropriate form of temporary storage, depending on the preferred implementation, and in one example can include high-performance FIFO (First-In-First-Out) field memory chips, or the like. The input buffer is typically connected to an HDMI port, display port output, or any other suitable video source, whilst the data buffer 335 is connected to a USB port, thereby allowing equivalent connection to the computer system.

The transceiver 324 can be of any appropriate form, but in one example allows for short range radio based communication 360 between the encoder and decoder, for example via a point to point direct WiFi™ connection, 60 GHz wireless technology, or the like.

The processing device 322 can be any device capable of performing the compression process, including the compression processes described herein. The processing device 322 could include a generic processing device operating in accordance with software instructions stored in memory. However, in one example, in order to ensure a suitably quick compression time, the processing device includes custom hardware configured to perform the compression process. This could include, firmware optionally associated with implementing logic such as an FPGA (Field Programmable Gate Array), a Graphics Processing Unit (GPU), an Application-Specific Integrated Circuit (ASIC), Digital Signal Processing (DSP), or any other electronic device, system or arrangement. In a preferred example, the encoder processing device 322 is configured to perform parallel processing of individual channels. For example, this could include parallel encoding of the individual frequency coefficients for each channel. Furthermore, whilst a single encoder processing device 322 is shown, in practice, a respective encoder processing device 322, could be provided for encoding each of the channels in parallel, or alternatively a GPU or other similar parallel processing architecture could be used. In the event that a channel, such as the Y channel, is not encoded, then the encoder processing device may simply introduce a delay in transmitting the respective data to the encoder output buffer 323, ensuring this is still synchronised with the encoded CbCr channels.

The decoder 330 typically includes a transceiver 334 coupled to a decoder input buffer 331, in turn coupled to a decoder processing device 332 and a decoder output buffer 333. A separate data buffer 335 can also be provided coupled to the transceiver 334.

In use, compressed image data is received from the encoder 320 via the transceiver 334, and temporarily stored in the input buffer 331, before being passed to the decoder processing device 332 for decompression. The resulting image data is then stored in the decoder output buffer 333, before being transferred to the display device 340. The transceiver 324 is also adapted to transfer other data, such as a sensor data received from the display device 340, via the decoder data buffer 335.

The buffers 331, 333, 335 can be of any appropriate form of temporary storage, depending on the preferred implementation, and in one example can include high-performance FIFO (First-In-First-Out) field memory chips, or the like. The output buffer is typically connected to an HDMI port, whilst the data buffer 335 is connected to a USB port, thereby allowing equivalent connection to the display device.

The transceiver 334 can be of any appropriate form, but in one example allows for short range radio based communication 360 between the encoder and decoder, for example via a point to point direct WiFi™ connection, 60 GHz wireless technology, or the like.

The processing device 332 could include a generic processing device operating in accordance with software instructions stored in memory. However, in one example, in order to ensure a suitably low decompression time, the processing device includes custom hardware configured to perform the decompression process. This could include, firmware optionally associated with implementing logic such as an FPGA (Field Programmable Gate Array), a Graphics Processing Unit (GPU), an Application-Specific Integrated Circuit (ASIC) or any other electronic device, system or arrangement. In a preferred example, the decoder processing device 332 is configured to perform parallel decompression of individual channels, for example by performing parallel encoding of the individual frequency coefficients. Again, whilst a single decoder processing device 332 is shown, in practice, a respective encoder processing device 332 could be provided for encoding each of the channels in parallel, or alternatively a GPU or other similar parallel processing architecture could be used. In the event that a channel, such as the Y channel, is not encoded, then the decoder processing device may simply introduce a delay in transmitting the respective data to the decoder output buffer 333, ensuring this is still synchronised with the CbCr channels.

The display device 340 includes at least one microprocessor 341, a memory 342, an optional input/output device 343, such as a keypad or input buttons, one or more sensors 344, a display 345, and an external interface 346, interconnected via a bus 347 as shown.

The display device 340 can be in the form of HMD, and is therefore provided in an appropriate housing, allowing this to be worn by the user, and including associated lenses, allowing the display to be viewed, as will be appreciated by persons skilled in the art.

In this example, the external interface 347 is adapted for normally connecting the display device to the processing system 310 via a wired connection. Although a single external interface 347 is shown, this is for the purpose of example only, and in practice multiple interfaces using various methods (eg. Ethernet, serial, USB, wireless or the like) may be provided. In this particular example, the external interface would typically include at least a data connection, such as USB, and video connection, such as DisplayPort, HMDI, Thunderbolt, or the like.

In use, the microprocessor 341 executes instructions in the form of applications software stored in the memory 342 to allow the required processes to be performed. The applications software may include one or more software modules, and may be executed in a suitable execution environment, such as an operating system environment, or the like. Accordingly, it will be appreciated that the processing device could be any electronic processing device such as a microprocessor, microchip processor, logic gate configuration, firmware optionally associated with implementing logic such as an FPGA (Field Programmable Gate Array), a Graphics Processing Unit (GPU), an Application-Specific Integrated Circuit (ASIC) or any other electronic device, system or arrangement.

The sensors 344 are generally used for sensing an orientation and/or position of the display device 340, and could include inertial sensors, accelerometers or the like. Additional sensors, such as light or proximity sensors could be provided to determine whether the display device is currently being worn, whilst eye tracking sensors could be used to provide an indication of a point of gaze of a user.

In one example, the display device could therefore be an existing commercial display device, such as an HTC Vive™, Oculus Rift™ or Playstation VR™ headset, although it will be appreciated that this is not essential and any suitable arrangement could be used.

An example of the operation of the image compression/decompression process will now be described in more detail.

For the purpose of this example, it is assumed that the processing systems 310 is executing applications software that generates content that is displayed on the display device 340, with the content being displayed dynamically based on sensor data from sensors 345 onboard the display device 340, and optionally other sensors, such as handheld controllers or position detection systems (not shown), as will be appreciated by persons skilled in the art.

Actions performed by the processing system 310 being performed by the processor 311 in accordance with instructions stored as applications software in the memory 312 and/or input commands received from a user via the I/O device 313, or other peripherals (not shown). Actions performed by the display device 340 are performed by the processor 341 in accordance with instructions stored as applications software in the memory 342.

The encoder 320 and decoder 340 act as interfaces between the processing system 310 and display device 340, allowing image data to be compressed, transmitted wirelessly, and then decompressed before being displayed on the display device 340, whilst also allowing sensor data or other input command data to be transferred back to the processing system. Actions performed by the encoder 320 and decoder 330 are typically performed by the respective processing device 322, 332, based on defined programming, and in one example a custom hardware configuration and/or instructions in embedded firmware.

However, it will be appreciated that the above described configuration assumed for the purpose of the following examples is not essential, and numerous other configurations may be used. For example, the functionality of the encoder and decoder could be inbuilt within the processing system 310 and display device 340 directly. Additionally, the compression techniques can be applied in a wide range of other scenarios, including compressing and decompressing image streams on one or more computer systems, without requiring the use of the separate display device. Nevertheless, the above arrangement is particularly beneficial for virtual, augmented or mixed reality applications, telepresence applications, or the like.

Figure 4A:
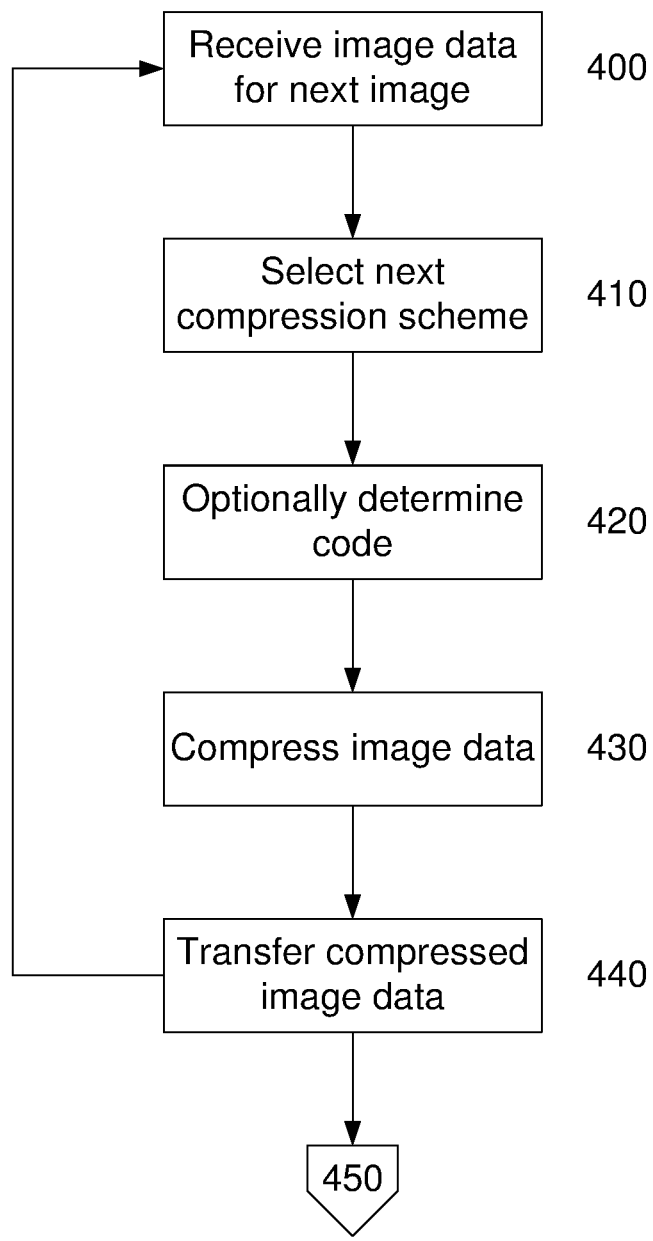
FIGS. 4A and 4B are a flow chart of a further example of a method for compressing and subsequently decompressing image data forming part of a digital content stream.
Figure 4B:
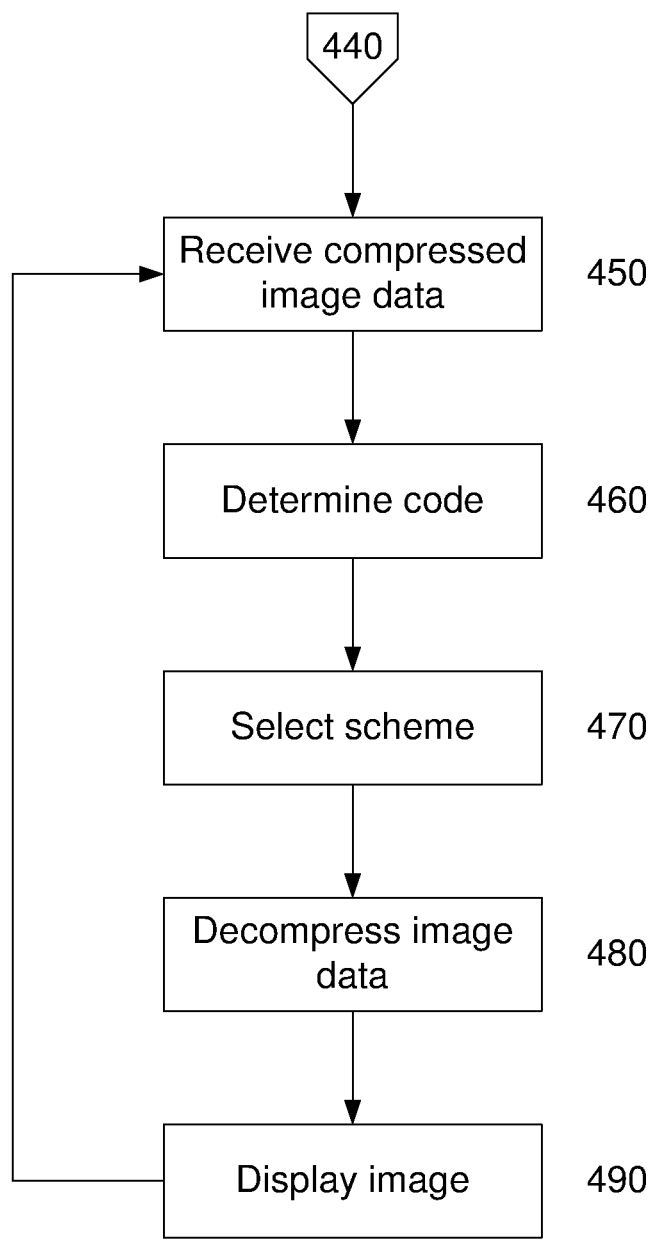
Figure 5A:
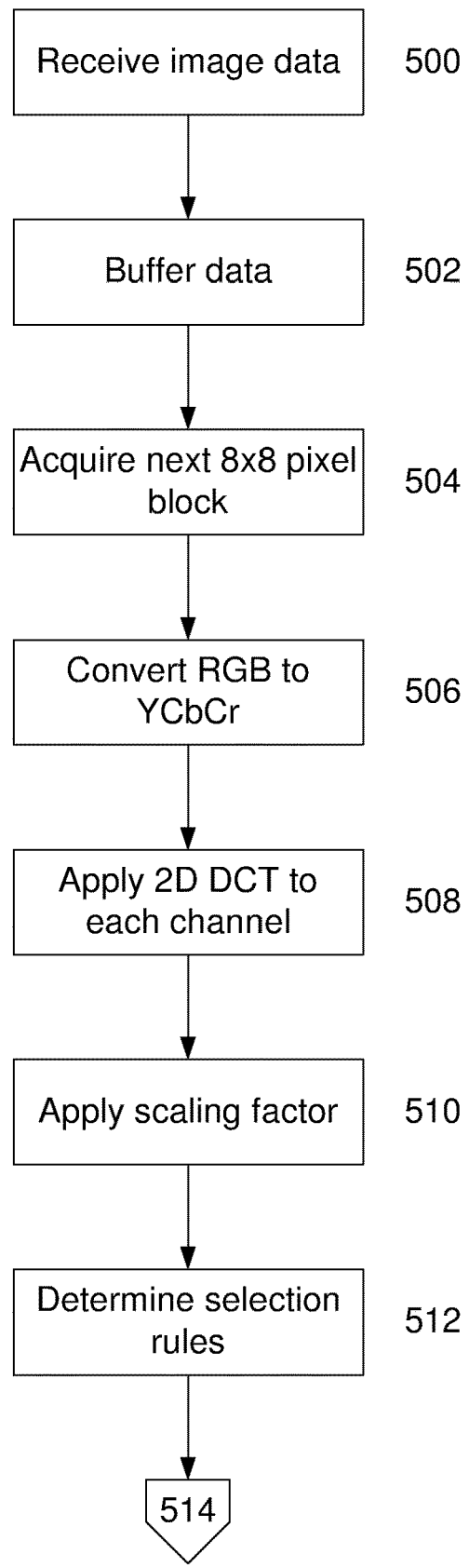
FIGS. 5A to 5D are a flow chart of a specific example of a method for compressing and subsequently decompressing image.
Figure 5B:
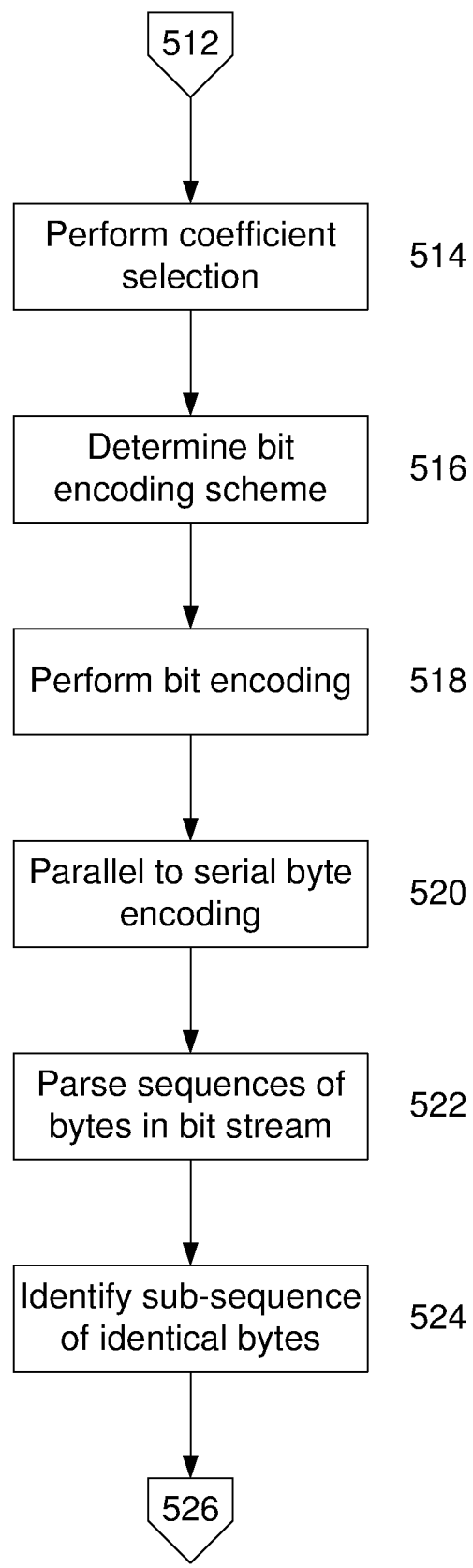
Figure 5C:
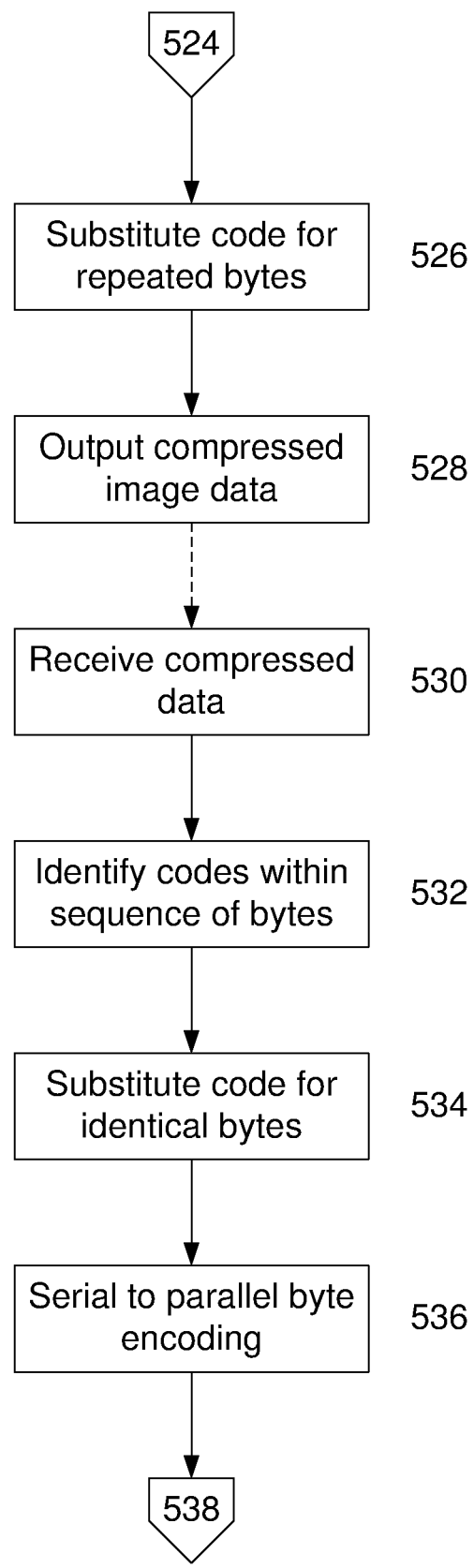
Figure 5D:
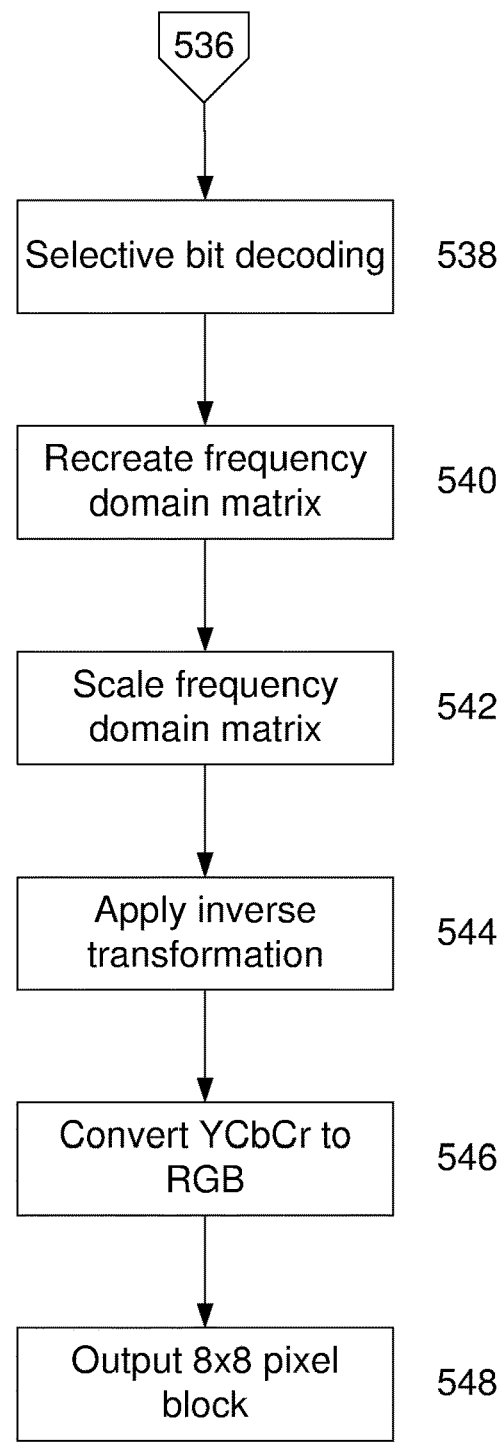

An example compression/decompression process will now be described in more detail with reference to FIGS. 4A and 4B.

In this example, at step 400 the encoder 320 receives image data, and in particular video data representing a sequence of images, from the processing system 310, and temporarily stores this in the encoder input buffer 321.

At step 410, the encoder processing device 322 selects a next compression scheme, optionally determining a code associated with the selected compression scheme, at step 420. The manner in which the compression scheme is selected will vary depending on the preferred implementation and could include selecting a next scheme from a defined sequence of compression schemes, or could be performed based on factors, such as overall desired degrees of compression, latency requirements, the nature of the image content or the like.

The image data is then compressed by the encoder processing device 322, at step 430, and optionally combined with the code before being transmitted to the decoder 330 at step 440. Specifically, the compressed image data is typically stored in the output buffer 323 until sufficient data is present, at which time a data packet is created and transmitted to the encoder by the transceiver 324. This process is repeated for all of the images in the content stream, typically cycling through a sequence of compression schemes every n images, as required.

At step 450 the decoder 330 receives the compressed image data via the transceiver 334 and temporarily stores this in the input buffer 331. At step 460, the decoder processing device 332 determines the code associated with the compressed image data and uses this to determine a decompression scheme at step 470. The decoder processing device 332 then decompresses the image data at step 480, storing this in the output buffer 333 for display at step 490. Again, this is repeated for each of the images in the content stream, as required.

A specific example compression/decompression process will now be described in more details with reference to FIGS. 5A to 5D.

In this example, the encoder 320 receives image data, and in particular video data representing a sequence of images, from the processing system 310, and temporarily stores this in the encoder input buffer 321 at step 500 and 502. The image data is analysed, for example by parsing the data to identify flags within the data that delimit headers, identify the start of an image, or the like, allowing image data corresponding a next block of 8×8 pixels to be acquired at step 504. In this regard, when buffering the data, the encoder requires an initial 8×8 block of pixels from the image in order to commence processing. Accordingly, the encoder input buffer 321 is populated with the first seven lines of pixels of an image, as well as the first eight pixels of the eighth line of pixels, before processing can commence. As the next eight pixels are received, the next 8×8 block can be processed, with this being repeated until all pixels in the first eight rows of the image have been processed. Following this a next group of eight rows can be processed in a similar manner.

The image data is typically in the form of multi-channel RGB data, which is then converted by the processing device 322 to YCbCr luminance and chrominance channels at step 506. This process can be performed using a known mathematical coordinate transformations, and this will not therefore be described in further detail.

At step 508 a 2D DCT is applied to each of the luminance and chrominance channels, to thereby transform the channels into the frequency domain. This process can be performed using known techniques, and in a preferred example is performed by the processing device 322 in a highly parallel fashion to thereby reduce processing times. The result of the transformation process on each channel is an 8×8 matrix, having 64 frequency coefficients, representing the magnitude of different frequency components in the respective image channel.

At step 510, a scaling factor is applied to each matrix, for example by dividing each frequency coefficient by the scaling factor to thereby reduce the magnitude each frequency coefficient. The scaling factor could be of any value and may be different for different channels. As part of this process, the scaled frequency coefficients are generally rounded to integer or other set number of significant figures, thereby reducing the volume of data needed to encode the frequency coefficients. For example, a coefficient of 500 would require 9 bits to encode, whereas 50 requires only 6 bits, so applying a scaling factor of 10 can reduce the number of bits required to encode the respective frequency coefficients.

In this approach, it will be appreciated that lower value coefficients might be rounded to zero, for example with 4 being scaled to 0.4 and hence rounded to 0. Whilst this leads to a loss of information, this will tend to occur for higher frequency components, which are known to contribute less to the overall appearance of the image, and hence such losses are of limited impact.

After applying the scaling factor, selection rules are determined at step 512. The selection rules are used to allow some of the frequency components to be selected, so that others can be discarded at step 514. The selection is typically performed based on levels, defined as a hierarchy diagonally across the matrix, so that an 8×8 frequency domain matrix includes 15 levels having 1, 2, 3, 4, 5, 6, 7, 8, 7, 6, 5, 4, 3, 2, 1 coefficients respectively.

The levels that are discarded are typically the higher frequency components, which as mentioned above contribute less to the appearance of the image. The selection rules define which levels are discarded based on a wide range of factors, depending on the preferred implementation.

For example, chrominance channels typically contribute less to the appearance of the image that the luminance channel, so that more levels will typically be discarded for the chrominance as opposed to the luminance channel. Thus for example, for the luminance channel Y, levels 1 to 8 may be retained, corresponding to 36 frequency coefficients, as shown at 631 in FIG. 6, whereas for the chrominance channels Cb and Cr, levels 1 to 6 may be retained, corresponding to only 21 frequency coefficients, as shown in 632 and 633 in FIG. 6. It will be appreciated that this reduces the total number of frequency coefficients that need to be encoded from 192 to 78 across all three channels.

Selecting which levels are retained based on rules, allows the encoder and decoder to apply the same criteria when selecting which levels are retained, which in turn allows this to be performed adaptively in realtime. This in turn allows different levels to be selected based on other factors, such as the quality and or bandwidth of a communications channel between the encoder and decoder. Thus, if the bandwidth is reduced due to interference, fewer levels might be selected, which will result in a higher degree of compression. Whilst this will result in a reduction in image quality, in many applications, such as VR, the reduction in quality for some frames will be less noticeable than dropped frames or increased latency, and hence is a preferable outcome.

Other factors could include, but are not limited to movement, and in particular a rate of movement, of the display device, image display requirements, a target display resolution, a position of the array of pixels within the one or more images and a position of the array of pixels within the one or more images relative to a point of gaze of an observer of the one or more images. Further examples will be described in more detail below.

At step 516, a bit encoding scheme is determined, allowing the selected frequency coefficients to be selectively encoded using different numbers of bits at step 518. In this regard, as described above, a scaled frequency component may only require 6 bits to fully encode the coefficient. Accordingly, the bit encoded scheme is selected so that the number of bits used to encode the frequency coefficients varies for each level within the hierarchy. This is feasible as higher frequency components typically have a smaller magnitude and hence require less bits to be encoded.

In one example, the encoding scheme used for the luminance channel is different for the chrominance channel, with an example encoding scheme being shown in Table 1, below.

TABLE 1

| | No. Bits | |
| --- | --- | --- |
| Level | Luminance Channel | Chrominance Channel |
| 1 | 8 | 6 |
| 2 | 6 | 4 |
| 3 | 6 | 4 |
| 4 | 4 | 3 |
| 5 | 4 | 2 |
| 6 | 3 | 2 |
| 7 | 3 | 0 |
| 8 | 2 | 0 |

Figure 6:
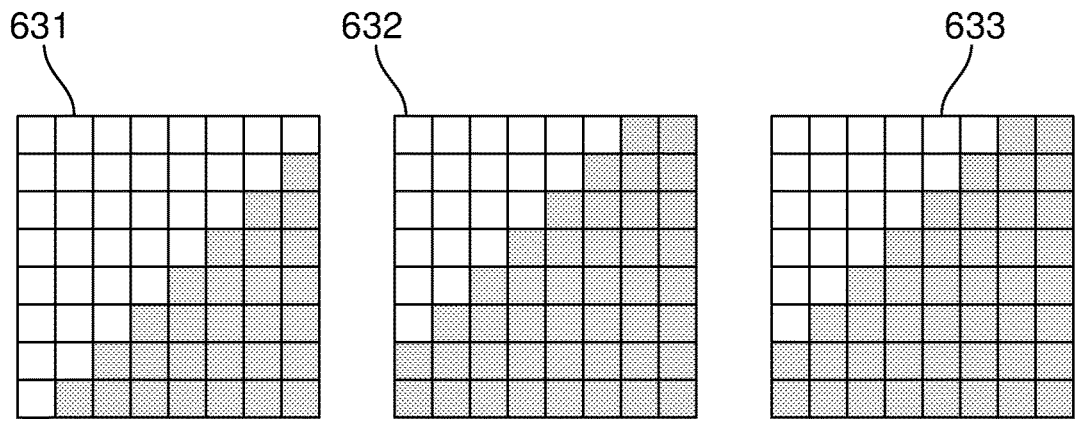
FIG. 6 is a schematic diagram illustrating aspects of the encoding process.
Figure 6:
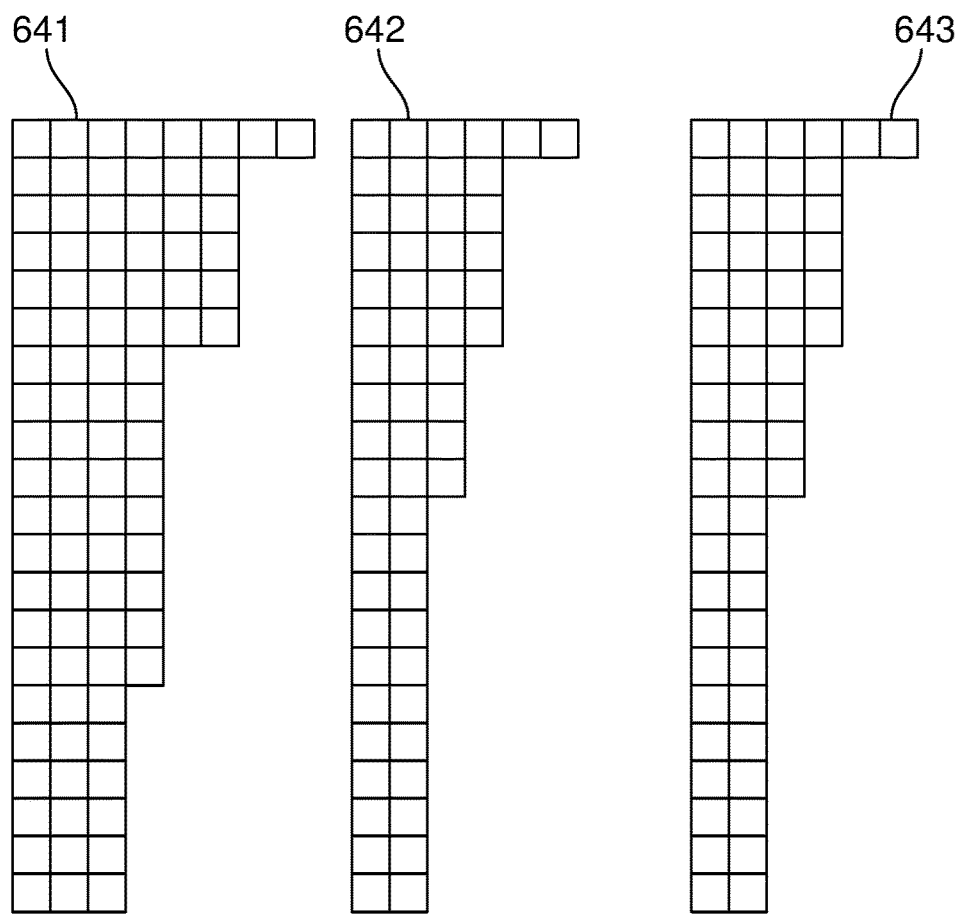

An example of this form of encoding for the first 6 levels of each of the three channels is shown in FIG. 6. Using this particular combination of selection rules and bit encoding scheme results in the luminance channel 641 being encoded with 129 bits, and each of the chrominance channels 642, 643 being encoded with 60 bits, resulting in all three channels of the 8×8 pixel array being encoded with just 249 bits. It will be apparent that this compares to the original uncompressed image data requiring 192 bytes, representing more than a six fold compression.

It will be appreciated from this that encrypting channels with 0 bits, effectively corresponds to discarding the channel, and so this can be used as an approach for selecting the coefficients that are encoded, by selecting an encoding scheme using the encoding rules, to thereby effectively combine steps 512 and 514 with 516 and 518.

Once the encoding has been performed, the bit encoded frequency components can be concatenated into a bit stream at step 520 by performing parallel to serial byte encoding, allowing this to be expressed as 32 bytes (256 bits). At step 522, the bytes are parsed to identify sub-sequences of identical bytes at step 524. Specifically, this approach is used to identify sub-sequences of three or more identical bytes, which can then be substituted for a code at step 526, without any loss of information.

In particular, for most images there are strings of zeros in the resulting encoded frequency coefficients, where the scaled coefficients have rounded to zero. Accordingly, these can be substituted by a code, which can be identified by the decoder, allowing the decoder to reinsert the sub-sequence of identical bytes.

Whilst the code could of any suitable form, in one example the code includes a header identifying that the particular byte is a code, and information corresponding to the value of and number of identical bytes. In a preferred arrangement a 2 byte code is combined using a Boolean OR operation with the number of zeros in a row (1-8). In one example, the number of zeros is represented as N-1, so that the numbers of 0-7 are ORed with the 2 byte code so that these only take up 3 bits of the second byte. For example, the code used can be (1111 1111 ; 1111 1000) with the second byte OR'ed with 0-7 depending on the number of zeros. It will be appreciated that similar approaches could be used for different values.

This approach works well as the encoding rarely results in consecutive numbers greater than or equal in value to 248, so the decoding algorithm can simply search for one byte having a value of 255 and a subsequent byte having a value greater than or equal to 248, identifying this as a code as opposed to encoded frequency components. This code is then replaced by bytes corresponding to the data with the number of a sequence of zeros represented by the last 3 bits of the second byte. This can lead to a further 19-25% reduction in data after the bit encoding stage based on testing to date.

Having performed code substitution, compressed image data can be output at step 528. Specifically, the compressed image data is typically stored in the output buffer 323 until sufficient data is present, at which time a data packet is created and transmitted to the encoder by the transceiver 324.

At step 530 the decoder 330 receives the compressed data via the transceiver 334, storing this in the decoder input buffer 331. The data is parsed at step 532 to identify codes within the data, as described above, with these being substituted with sub-sequences of repeated identical bytes at step 534 to thereby recreate the bit stream of bit encoded frequency coefficients.

At step 536, the decoder processing device 332 determines the bit encoding scheme used to encode the image data, using this to perform serial to parallel decoding of the bit stream, to thereby determine the encoded frequency coefficients at step 538. In particular, this allows the decoder processing device 332 to determine the number of bits used to encode each frequency coefficient, allowing the bit stream to be effectively segmented into individual encoded frequency coefficients. The individual frequency coefficients are used to recreate the scaled frequency matrix at step 540, with discarded frequency coefficients being generated using null values, to thereby populate the entire matrix, which is in turn scaled at step 542, based on the scaling coefficient.

At step 544 an inverse 2D DCT transform is applied, before the transformed matrix for each YCbCr channel is converted into RGB channels at step 546, allowing an 8×8 pixel block to be output at step 548, allowing this to be rendered by the display device 340.

Accordingly, the above described process allows significant reduction in the amount of image data required to encode each 8×8 block of pixels, and hence overall images. In particular, this is achieved using a combination of 2D DCT of YCbCr channels, selective bit encoding of resulting frequency coefficients and an optional final lossless coding scheme. Each channel can be processed in parallel, with the DCT being applied to the 8×8 array in a parallel approach. Furthermore, bit encoding of each of the frequency coefficients also happens in parallel, resulting in a massively parallel approach, allowing both compression and decompression to be performed in a rapid manner, resulting in minimal impact on latency, which is important in real-time applications, such as VR, AR and telepresence.

Figure 7:
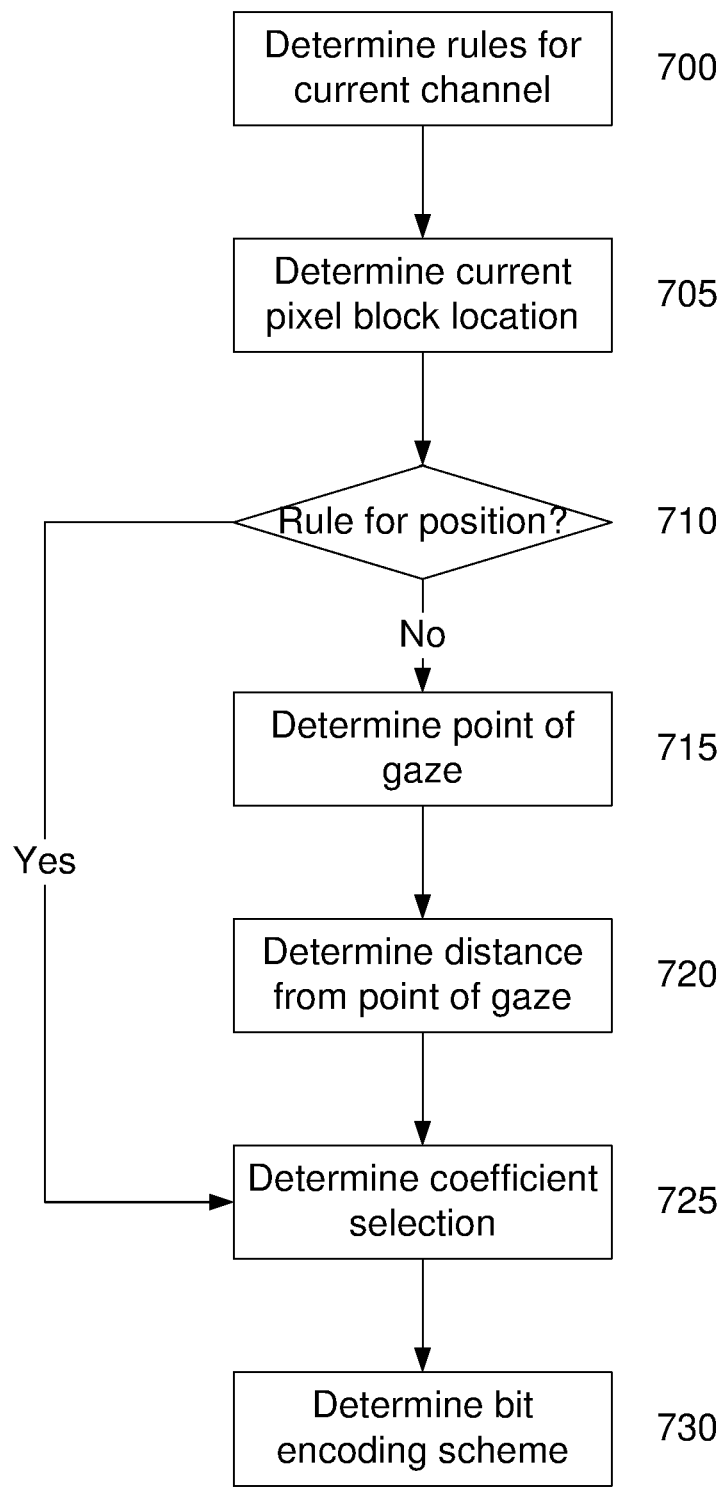
FIG. 7 is a flow chart of an example of a method of selecting a bit encoding scheme.
Figure 8:
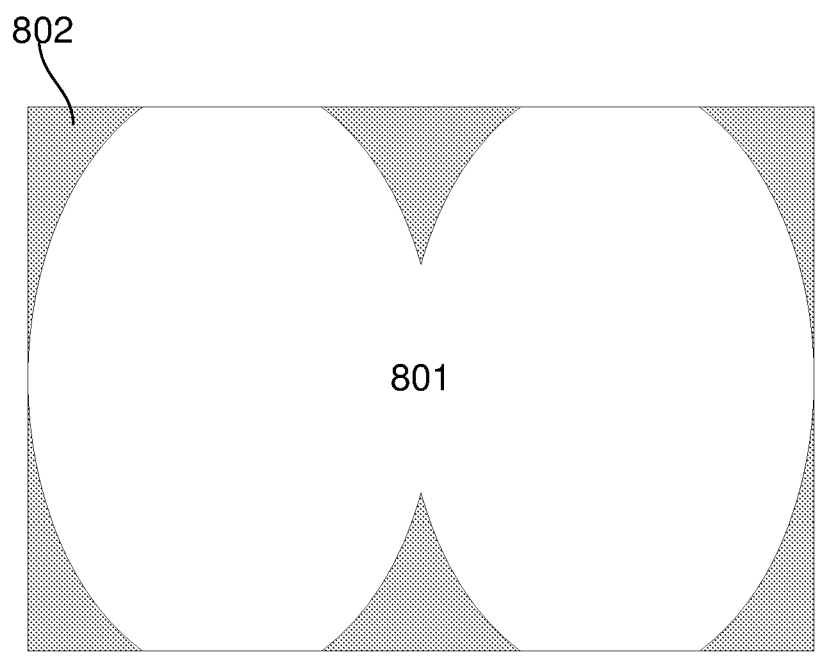
FIG. 8 is a schematic diagram of an example of an image to be encoded.

An example of an approach for implementing selection rules will now be described with reference to FIGS. 7 and 8.

In particular, this example focuses on how the spatial positioning of the pixel array within an image can be used to influence the selection process, and hence the amount of compression that is performed. Similar processes can be performed for other factors and these will not therefore be described in detail. This process is also identical for the encoder or decoder, and the description will focus on operation of the encoder for the purpose of ease of illustration only.

In this example, at step 700, the encoder processing device 322 determines selection rules for the current channel. In this regard, different rules typically apply for each of the luminance and chrominance channels as previously described. The encoder processing device 322 then determines the location of the pixel array within the image at step 705 and from this determines if there is an absolute rule associated with that position. In this regard, when an image is displayed using a headset, the lens arrangement typically means that portions of the image are not viewable. An example of this, is shown in FIG. 8, which shows viewable portions 801 and non-viewable portions 802 of an image. In this instance, if the pixel array is located in an unviewable portion 802, there is no need to encode the pixel array, and hence the process can simply discard all levels of the frequency coefficients. Accordingly, if a rule exists at step 710, for the absolute position of the pixel array, the process proceeds to step 725 following the 'Yes' path, allowing a respective level selection to be determined and then used with a respective bit encoding scheme at step 730, as described above with respect to steps 514 to 518.

Otherwise, the process follows the 'No' path to step 715, the encoder processing device 322 determines a point of gaze of an observer of the image. This can be achieved using eye tracking sensing systems, as will be appreciated by persons skilled in the art. Once this has been determined, a relative position, and in one example a distance between the point of gaze and the current pixel array location is determined at step 720, with this being used to guide coefficient and/or bit encoding scheme determination at steps 725 and 730. In this regard, as an individual's peripheral vision does not perceive the same level of detail as their focal position, a greater degree of compression can be used further from the user's point of gaze.

In one example, a region of minimum compression can be defined surrounding the user's point of gaze, with the degree of compression increasing moving outwardly from the minimum region. The region can be of any shape and could be circular, elliptical, ovoid, or the like, depending on the particular circumstances. The region could also be off centred relative to the point of gaze, for example, so ensure minimum compression is used below the point of gaze, which is a region generally perceived with greater awareness by the user.

It will also be appreciated that in circumstances in which the user's point of gaze cannot be measured, this could be predicted. In general the prediction would be focused on a centre of the screen, but it will be appreciated that this is not essential and could be changed, for example based on factors such as the nature of the content being presented, a direction of headset movement or the like.

Thus, it will be appreciated that this describes a mechanism that allows selective encoding to be performed on the basis of either absolute and/or relative position of the pixel array within the image. By having each of the encoder and decoder execute the same algorithm for selecting the encoding scheme and selection used, this allows the decoder to reliably and accurately decompress the compressed image data, whilst still allowing encoding to be performed dynamically to maximise the overall level of compression, whilst minimising the perceived loss in image quality.

It will be appreciated that similar approaches could be used for other factors, such as transmission quality and/or bandwidth, thereby ensuring the degree of compression is optimised for the current circumstances.

Figure 9:
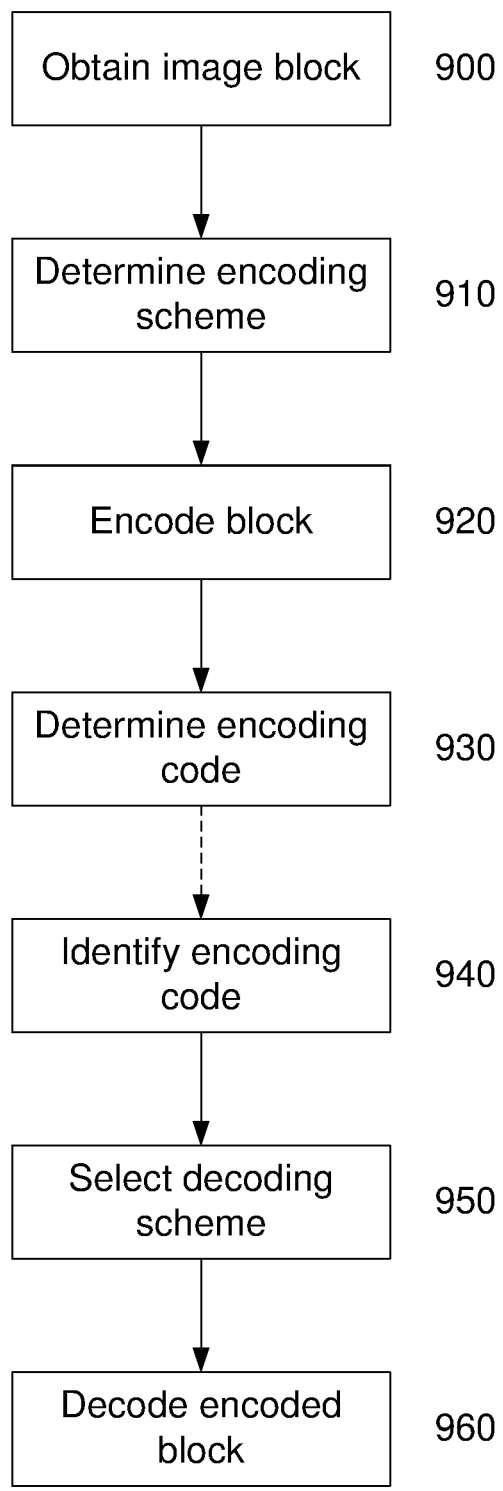
FIG. 9 is a flow chart of another example of an encoding/decoding scheme for compressing image data and decompressing compressed image data.

A further example of a method for compressing image data and subsequently decompressing compressed image data will now be described with reference to FIG. 9.

Whilst described as a stand-alone example, it will be understood from the following description that the current example can be used in conjunction with the above described compression/decompression technique in order to provide for further improved compression and computational efficiency. In particular, the above described techniques represent one of the options that can be employed within the following process, but it will also be appreciated that other compression techniques could be used as appropriate, depending on the circumstances.

In this example, at step 900 pixel data representing an array of pixels within the one or more images is obtained from image data. This can be achieved in any suitable manner, but typically involves buffering image data as this is received, until an array of pixels, such as an 8×8 array, has been obtained in a manner similar to that described above.

At step 910 an encoding scheme is determined, typically be selecting an encoding scheme from one or a number of previously defined encoding schemes, such as the encoding scheme described above. The selection can be performed in any appropriate manner, such as through analysis of the image and/or pixel data, based on an image type associated with the image, based on instructions from an image source or display, or the like, and this is typically performed to provide a greater or lesser degree of compression, depending on the particular requirements of the current situation.

At step 920, the pixel data is encoded using the encoding scheme, for example using the techniques outlined above, or the like. At step 930, an encoding code indicative of the encoding scheme is for example through a look-up associated with the available schemes, with this being used together with the encoded block to generate compressed image data. In one example, this can be achieved by adding the encoded code as a prefix to the encoded pixel data, although other approaches could be used, including simply by replacing the pixel data with the encoding code, for example using a code word substitution, depending on the encoding scheme used.

Once the compressed image data has been created, this can then be transferred to a destination for example as part of a byte stream, allowing this to be decoded to generate image data.

This process is typically performed by determining the encoding code from the compressed image data at step 940. In this regard, the encoding code typically has a set format, such as a particular combination of bits, allowing this be easily identified within a received byte stream. The encoding code is then used to determine the encoding scheme used, typically through a look-up process at step 950. The identified encoding scheme can then be used to decode the compressed image data at step 960, for example using the approach outlined above, to thereby generate pixel data representing the array of pixels within the one or more images.

Accordingly the above described process allows encoding to be performed using one of a number of encoding schemes. In a preferred example, the different encoding schemes are known in advance to both an encoder and a decoder, allowing these to be changed dynamically for each pixel array within the image that is being encoded/decoded. This ensures that the encoding scheme is optimised for the particular data being encoded, thereby maximising the compression that can be achieved, whilst ensuring that other desired properties, such as image quality and encoding time, are maintained.

A number of further features will now be described.

When encoding the image, the process typically involves determining the encoding scheme based on one or more of a range of different factors, including an image type of the image data, an encoding scheme indication received from an image data source or display, by analysing at least one of the image data and the pixel data, or based on compression requirements such as a required compression amount, a resulting image quality, a compression latency, or the like.

Thus, for example, a different type of encoding could be used when encoding photos as opposed to computer generated graphics, which often have quite different properties. The nature of the image could be obtained from metadata associated with the image, or based on properties of the image itself. Alternatively, an image source supplying the image data, such as a computer system supplying the image data for transfer to a display or other computing device, could specify the encoding scheme that should be used.

A further example is to analyse the pixel data to identify characteristics of the pixel array. For example, if the pixel array has a single colour, a different algorithm could be used to if the pixel array contains multiple colours. This is particularly useful for encoding large areas of an image that have a single colour, such as a sky or background, with this allowing a single encoding code indicative of the solid colour to be used to replace the pixel data for the entire pixel array, thereby resulting in a maximum amount of compression, with no effective loss in image quality.

A further example is the identification of gradients or boundaries, which can result in undesirable image artefacts using many image compression approaches, and hence may require an alternative compression approach.

In one preferred example, where the pixel array is not a solid colour, the approach outlined above with respect to FIGS. 5 and 6 is used. In the event that the pixel array does not contain a gradient or boundary, the technique can involve encoding all three of the YCbCr channels. However, in the event that the pixel array contains a gradient or boundary, the Y channel could be passed through unencoded, so that additional luminance information is retained. Whilst this reduces the ultimate amount of compression obtained, the compression amount is still significant due to the compression of the CbCr channels, whilst the additional retained colour information can significantly improve the quality of the resulting image in the region of the gradient or boundary.

The selection could also be used to control other aspects of a compression algorithm. For example, this could be used to specify which frequency coefficients are retained in the above described compression process, in a manner similar to that performed with respect to the process of FIG. 7.

The encoding code is typically specified in the form of a number from 0 to 255, which can be defined by a single byte, and which allows a selection to be made from up to 256 different encoding schemes. This allows a wide range of different encoding schemes to be used, with these being assigned to a respect one of the numbers 0 to 255, so that a wide range of different encoding schemes can be used to thereby optimise the compression achieved for a desired image quality. In one particular example, it will be appreciated that industry standard lists of coding schemes could be established, thereby allowing encoding and decoding systems to interoperate even with no prior communication to establish the encoding schemes to be used.

In one particular example, the encoding code could be identified by preceding byte of a fixed format, such as "11111111", so that the encoding code used to select an encoding scheme assigned to the number 1 would be given by "1111111100000001". It will be appreciated that performing this allows the decoding process to easily identify the encoding process used. However, any suitable approach could be used and the above example is not intended to be limiting.

It will be appreciated that a similar approach is used when decoding the compressed image data, with the approach including substituting an encoding code for an array of pixels of a solid colour, or using the previously described decoding process.

It will also be appreciated that the image compression process could be performed using apparatus similar to that described above, and this will not therefore be described in any further detail.

Accordingly, the above described processes allow for significant digital content compression, without adversely effecting latency, allowing for the techniques to be used in providing wireless connections to virtual or augmented reality wearable displays using existing hardware, whilst also allowing for improved image compression to be achieved more broadly in other applications.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method of compressing image data from images forming part of a digital content stream configured for wireless transmission, the method including for multiple sequences of n images within the digital content stream, wherein n is more than 2:
  a) obtaining image data for each of the n images, wherein the images are frames in the digital content stream and the digital content stream is at least one of:
  i) virtual reality;
  ii) mixed reality; and,
  iii) augmented reality;
  b) sequentially and individually compressing the image data for each sequence of n images using a sequence of n different respective compression schemes, wherein each of the n images in each sequence of n images is compressed using a different compression scheme, the sequentially and individually compressing the image data comprising:
  i) obtaining next image data for a next one of the n images;
  ii) compressing the next image data using a next compression scheme of the sequence of n different respective compression schemes; and,
  iii) after compressing the next image data, repeating steps i) and ii) for each of the n images;

wherein each sequence of n images is compressed using the sequence of n different respective compression schemes, wherein the sequence of n different respective compression schemes is selected to reduce the perceived reduction in image quality by interspersing images that are compressed with a lossy compression scheme with images that are compressed with a lossless compression scheme, wherein the sequence of n different respective compression schemes comprises at least one lossless compression scheme and one or more of: run-length encoding, color space reduction, chroma subsampling, transform coding, and fractal compression, and wherein the compression schemes have different compression artefacts.

2. A method according to claim 1, wherein compressing the image data for each of the n images in the sequence using the corresponding compression scheme of the sequence of n different respective compression schemes includes at least one of:
 a) at least one of the n images is uncompressed;
 b) at least one of the n images is discarded to reduce a frame rate; and,
 c) at least two of the compression schemes provide a different degree of compression.

3. A method according to claim 1, wherein the method includes, for a first image of the sequence of n images:
 a) determining a first compression scheme from a plurality of compression schemes in accordance with at least one of:
  i) compression schemes used for an adjacent image in the sequence of n images;
  ii) a set degree of compression;
  iii) a transmission bandwidth of a communications link used to transmit the compressed image data;
  iv) a transmission quality of service of a communications link used to transmit the compressed image data;
  v) movement of a display device for receiving the digital content stream;
  vi) predicted movement of a display device for receiving the digital content stream;
  vii) image display parameters for displaying the digital content stream;
  viii) a target display resolution for displaying the digital content stream;
  ix) a channel being processed;
  x) a position of the array of pixels within the at least first image of the sequence of n images; and,
  xi) a position of the array of pixels within the at least the first image of the sequence of n images relative to a point of gaze of an observer of the at least the first image of the sequence of n images; and,
 b) compressing the image data with the selected first compression scheme to generate compressed image data;
 c) determining an encoding code indicative of the determined first compression scheme; and,
 d) associating the encoding code with the compressed image data.

4. A method according to claim 1, wherein the method includes using at least one compression scheme to:
 a) obtain pixel data from the image data, the pixel data representing an array of pixels within the one or more images;
 b) determine a position of the array of pixels within the one or more images relative to a defined position, the defined position being indicative of a point of gaze of the user; and
 c) compress the pixel data in accordance with the determined position so that a degree of compression depends on the determined position of the array of pixels and so that the degree of compression at least one of:
  i) is based on a distance from the determined position to the array of pixels;
  ii) is based on a direction in the image relative to the determined position;
  iii) progressively increases moving outwardly from the determined position; and,
  iv) provides foveated compression.

5. A method according to claim 1, wherein the method includes using at least one of the compression schemes to:
 a) obtain pixel data from the image data, the pixel data representing an array of pixels within the one or more images;
 b) apply a transformation to the pixel data to determine a set of frequency coefficients indicative of frequency components of the array of pixels;
 c) selectively encode at least some of the frequency coefficients using a bit encoding scheme to thereby generate a set of encoded frequency coefficients, wherein the bit encoding scheme defines the number of bits used to encode each of the frequency coefficients, and wherein the frequency coefficients are selectively encoded so that at least one of:
  i) at least some of the encoded frequency coefficients have different numbers of bits;
  ii) a smaller number of bits are used to encode frequency coefficients corresponding to higher frequencies;
  iii) a number of bits are progressively reduced as they are used to encode frequency coefficients corresponding to frequencies that are progressively increased;
  iv) at least one frequency coefficient is encoded with zero bits so that the set of encoded frequency coefficients is smaller than the set of frequency coefficients; and,
  v) at least one frequency coefficient is encoded with zero bits corresponding to higher frequencies; and,
 d) generate compressed image data using the encoded frequency coefficients.

6. A method according to claim 5, wherein the method includes:
 a) selecting the bit encoding scheme from a plurality of bit encoding schemes based on at least one of the compression schemes, wherein each of the plurality of bit encoding schemes selectively encodes different frequency coefficients with respective different numbers of bits to provide a different degree of compression and wherein the bit encoding scheme is selected at least in part depending on at least one of:
  i) a set degree of compression; and,
  ii) the position of the array of pixels; and,
 b) encoding the frequency coefficients in accordance with the selected bit encoding scheme.

7. A method according to claim 1, wherein each image is a frame and wherein the method allows each frame within the digital content stream to be compressed individually.

8. System for compressing image data from images forming part of a digital content stream, the system including, for multiple sequences of n images within the digital content stream configured for wireless communication, wherein n is more than 2, at least one microprocessor that:
  a) obtains image data for each of the n images, wherein the images are frames in the digital content stream and the digital content stream is at least one of:
    i) virtual reality;
    ii) mixed reality; and,
    iii) augmented reality;
  b) sequentially and individually compresses the image data for each sequence of n images using a sequence of n different respective compression schemes, wherein each of the n images in each sequence of n images is compressed using a different compression scheme, the sequentially and individually compressing the image data comprising:
    i) obtaining next image data for a next one of the n images;
    ii) compressing the next image data using a next compression scheme of the sequence of n different respective compression schemes; and,
    iii) after compressing the next image data, repeating steps i) and ii) for each of the n images;
  wherein each sequence of n images is compressed using the sequence of n different respective compression schemes wherein the sequence of n different respective compression schemes is selected to reduce the perceived reduction in image quality by interspersing images that are compressed with a lossy compression scheme with images that are compressed with a lossless compression scheme; wherein the sequence of n different respective compression schemes comprises at least one lossless compression scheme and one or more of: run-length encoding, color space reduction, chroma subsampling, transform coding, and fractal compression and wherein the compression schemes have different compressing artefacts.

9. The system according to claim 8, wherein the system further includes:
  a) an encoder input buffer stored on a non-transitory computer-readable medium that, when executed by the microprocessor, receives the image data;
  b) an encoder output buffer stored on a non-transitory computer-readable medium that, when executed by the microprocessor, stores compressed image data; and,
  c) an encoder transmitter stored on a non-transitory computer-readable medium that, when executed by the microprocessor, transmits the image data from the encoder output buffer.

10. The system according to claim 8, wherein the system includes an encoder computing device stored on a non-transitory computer-readable medium in wireless communication with a decoder computing device stored on a non-transitory computer-readable medium, that, when executed by the microprocessor, allows image data to be transferred between the encoder computing device and decoder computing device as compressed image data.

11. A method of decompressing compressed image data representing images forming part of a digital content stream, the method including for multiple sequences of n images within the digital content stream configured for wireless communication, wherein n is more than 2:
  a) obtaining compressed image data for at least some of the n images, wherein the images are frames in the digital content stream and the digital content stream is at least one of:
    i) virtual reality;
    ii) mixed reality; and,
    iii) augmented reality;
  b) sequentially and individually decompressing the image data for each sequence of n images using a sequence of n different respective decompression schemes, wherein each of the n images in each sequence of n images is decompressed using a different decompression scheme, the sequentially and individually decompressing the image data comprising:
    i) obtaining next image data for a next one of the n images;
    ii) decompressing the next image data using a next decompression scheme of the sequence of n different respective decompression schemes; and,
    iii) after decompressing the next image data, repeating steps i) and ii) for each of the n images;
  wherein each sequence of n images is decompressed using the sequence of n different respective decompression schemes wherein the sequence of n different respective decompression schemes is selected to reduce the perceived reduction in image quality by interspersing images that are decompressed with a lossy compression scheme with images that are decompressed with a lossless decompression scheme; wherein the sequence of n different respective decompression schemes comprises at least one lossless compression scheme and one or more of: run-length encoding, color space reduction, chroma subsampling, transform coding, and fractal compression and wherein the decompression schemes have different decompressing artefacts.

12. A method according to claim 11, wherein the decompression scheme corresponds to a compression scheme used to generate the compressed image data and wherein the method includes determining the respective decompression scheme in accordance with at least one of:
  a) a compression scheme code indicative of the compression scheme used to compress the image data;
  b) a set degree of compression;
  c) a transmission bandwidth of a communications link used to transmit the compressed image data;
  d) a transmission quality of service of a communications link used to transmit the compressed image data;
  e) movement of a display device for receiving the digital content stream;
  f) predicted movement of a display device for receiving the digital content stream;
  g) image display parameters for displaying the digital content stream;
  h) a target display resolution for displaying the digital content stream;
  i) a channel being processed;
  j) a position of the array of pixels within the first image of the n images; and,
  k) a position of the array of pixels within the first image of the n images relative to a point of gaze of an observer of the first image of the n images.

13. A method according to claim 11, wherein the method includes using at least one decompression scheme to duplicate an image to recover a frame rate for a discarded image.

14. A method according to claim 11, wherein the method includes using at least one of the decompression schemes to:
  a) determine a set of encoded frequency coefficients from the compressed image data in accordance with a bit encoding scheme that defines the number of bits used in each encoded frequency coefficient;
  b) performing bit decoding of the encoded frequency coefficients in accordance with the bit encoding scheme to thereby generate a set of frequency coefficients, wherein at least one frequency coefficient is generated so that the set of encoded frequency coefficients is smaller than the set of frequency coefficients; and, c) applying an inverse transformation to the set of frequency coefficients to determine pixel data representing an array of pixels within the one or more images.

15. A method according to claim 14, wherein the method includes:

a) selecting the bit encoding scheme from a plurality of bit encoding schemes based on at least one of the decompression schemes; wherein each of the plurality of bit encoding schemes selectively encodes different frequency coefficients with respective different numbers of bits to provide a different degree of compression and wherein the bit encoding scheme is selected at least in part depending on at least one of:
   i) an encoding code;
   ii) the bit encoding scheme used to generate the compressed image data; and,
   iii) the position of the array of pixels; and, b) decoding the encoded frequency coefficients in accordance with the selected bit encoding scheme.

16. System for decompressing image data from images forming part of a digital content stream for multiple sequences of n images within the digital content stream configured for wireless communication, wherein n is more than 2, the system including at least one electronic decoder processing device comprising a microprocessor that performs the steps of:

a) obtaining compressed image data for at least some of the n images, wherein the images are frames in the digital content stream and the digital content stream is at least one of:
   i) virtual reality;
   ii) mixed reality; and,
   iii) augmented reality;

b) sequentially and individually decompresses the image data for each sequence of n images using a sequence of n different respective decompression schemes, wherein each of the n images in each sequence of n images is decompressed using a different decompression scheme, the sequentially and individually decompressing the image data comprising:
   i) obtaining next image data for a next one of the n images;
   ii) decompressing the next image data using a next decompression scheme of the sequence of n different respective decompression schemes; and,
   iii) after decompressing the next image data, repeating steps i) and ii) for each of the n images;

wherein each sequence of n images is decompressed using the sequence of n different respective decompression schemes wherein the sequence of n different respective decompression schemes is selected to reduce the perceived reduction in image quality by interspersing images that are decompressed with a lossy decompression scheme with images that are decompressed with a lossless decompression scheme; wherein the sequence of n different respective decompression schemes comprises at least one lossless compression scheme and one or more of: run-length encoding, color space reduction, chroma subsampling, transform coding, and fractal compression and wherein the decompression schemes have different decompressing artefacts.

17. The system according to claim 16, wherein the system includes:

a) a decoder input buffer stored on a non-transitory computer-readable medium that, when executed by the microprocessor, receives the compressed image data;

b) a decoder output buffer stored on a non-transitory computer-readable medium that, when executed by the microprocessor, stores the image data; and, c) a decoder transceiver stored on a non-transitory computer-readable medium that, when executed by the microprocessor, receives the compressed image data and provides the compressed image data to the input buffer.

18. The system according to claim 16, wherein the system includes a decoder computing device stored on a non-transitory computer-readable medium in wireless communication with an encoder computing device stored on a non-transitory computer-readable medium, that, when executed by the microprocessor, allows image data to be transferred between the encoder computing device and decoder computing device as compressed image data.

* * * * *